United States Patent
Case et al.

(10) Patent No.: US 11,419,386 B2
(45) Date of Patent: Aug. 23, 2022

(54) DOMED MIDSOLE WITH STAGED COMPRESSIVE STIFFNESS

(71) Applicant: NIKE, Inc., Beaverton, OR (US)

(72) Inventors: Patrick Case, Portland, OR (US); Zachary M. Elder, Portland, OR (US); Lee D. Peyton, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 118 days.

(21) Appl. No.: 16/984,455

(22) Filed: Aug. 4, 2020

(65) Prior Publication Data
US 2020/0359741 A1    Nov. 19, 2020

Related U.S. Application Data

(62) Division of application No. 15/983,512, filed on May 18, 2018, now Pat. No. 10,758,004.
(Continued)

(51) Int. Cl.
*A43B 13/18* (2006.01)
*B32B 7/05* (2019.01)
(Continued)

(52) U.S. Cl.
CPC .......... *A43B 13/186* (2013.01); *A43B 3/0042* (2013.01); *A43B 5/00* (2013.01); *A43B 13/023* (2013.01); *A43B 13/04* (2013.01); *A43B 13/127* (2013.01); *A43B 13/145* (2013.01); *A43B 13/184* (2013.01); *A43B 13/185* (2013.01); *A43B 13/187* (2013.01); *A43B 13/20* (2013.01); *B32B 3/12* (2013.01); *B32B 5/18* (2013.01); *B32B 7/022* (2019.01); *B32B 7/05* (2019.01); *B32B 27/065* (2013.01);
(Continued)

(58) Field of Classification Search
CPC ....... A43B 13/186; A43B 13/20; A43B 13/12; A43B 13/125; A43B 13/127; A43B 13/145; A43B 13/18; A43B 13/181
USPC .............................................. 36/35 B, 29, 28
See application file for complete search history.

(56) References Cited

U.S. PATENT DOCUMENTS

| 4,302,892 A | 12/1981 | Adamik |
| 5,638,565 A | 6/1997 | Pekar |

(Continued)

FOREIGN PATENT DOCUMENTS

| CN | 1901822 A | 1/2007 |
| CN | 103582434 A | 2/2014 |

(Continued)

*Primary Examiner* — Marie D Bays
(74) *Attorney, Agent, or Firm* — Quinn IP Law

(57) ABSTRACT

A sole structure for an article of footwear comprises a midsole including a first cushioning layer, a second cushioning layer, and a third cushioning layer. The first cushioning layer has a central portion, and a peripheral portion surrounding the central portion. The first cushioning layer, the second cushioning layer, and the third cushioning layer are stacked with the second cushioning layer directly overlying the peripheral portion of the first cushioning layer, and the third cushioning layer overlying the second cushioning layer and directly overlying the central portion of the first cushioning layer. The first cushioning layer has a domed lower surface extending away from the second cushioning layer and the third cushioning layer and substantially centered under the central portion.

16 Claims, 16 Drawing Sheets

Related U.S. Application Data

(60) Provisional application No. 62/510,000, filed on May 23, 2017.

(51) Int. Cl.

| | | |
|---|---|---|
| *A43B 13/12* | (2006.01) | |
| *B32B 7/022* | (2019.01) | |
| *A43B 3/00* | (2022.01) | |
| *A43B 5/00* | (2022.01) | |
| *A43B 13/02* | (2022.01) | |
| *A43B 13/04* | (2006.01) | |
| *A43B 13/14* | (2006.01) | |
| *A43B 13/20* | (2006.01) | |
| *B32B 3/12* | (2006.01) | |
| *B32B 5/18* | (2006.01) | |
| *B32B 27/06* | (2006.01) | |
| *B32B 27/30* | (2006.01) | |
| *B32B 27/40* | (2006.01) | |

(52) U.S. Cl.
CPC ............ *B32B 27/306* (2013.01); *B32B 27/40* (2013.01); *B32B 2307/7242* (2013.01); *B32B 2437/02* (2013.01)

(56) References Cited

U.S. PATENT DOCUMENTS

| | | | |
|---|---|---|---|
| 5,718,063 A * | 2/1998 | Yamashita | A43B 1/0072 36/35 B |
| 5,741,568 A * | 4/1998 | Rudy | A43B 7/144 442/244 |
| 5,933,983 A | 8/1999 | Jeon | |
| 5,993,585 A * | 11/1999 | Goodwin | B29C 66/81427 156/196 |
| 6,402,879 B1 * | 6/2002 | Tawney | A43B 13/20 36/35 R |
| 6,931,764 B2 | 8/2005 | Swigart et al. | |
| 6,973,690 B2 | 12/2005 | Muci et al. | |
| 7,197,840 B2 * | 4/2007 | Nakano | A43B 13/12 36/19 R |
| 7,685,743 B2 | 3/2010 | Swigart et al. | |
| 7,784,196 B1 | 8/2010 | Christensen et al. | |
| 7,950,167 B2 * | 5/2011 | Nakano | A43B 13/186 36/28 |
| 9,775,402 B2 | 10/2017 | Nonogawa et al. | |
| 10,758,004 B2 * | 9/2020 | Case | A43B 13/20 |
| 2001/0042321 A1 * | 11/2001 | Tawney | A43B 13/20 36/43 |
| 2004/0123495 A1 | 7/2004 | Greene et al. | |
| 2006/0156579 A1 | 7/2006 | Hoffer et al. | |
| 2010/0037482 A1 | 2/2010 | Litchfield et al. | |
| 2010/0325914 A1 | 12/2010 | Peyton | |
| 2011/0277916 A1 * | 11/2011 | Beye | B29D 35/122 156/145 |
| 2012/0102782 A1 * | 5/2012 | Swigart | A43B 13/185 12/146 B |
| 2012/0260526 A1 * | 10/2012 | Smith | A43B 13/20 36/83 |
| 2013/0000147 A1 | 1/2013 | Goodwin et al. | |
| 2013/0212909 A1 | 8/2013 | Bates et al. | |
| 2014/0259462 A1 * | 9/2014 | Taylor | B29D 35/122 12/146 R |
| 2015/0082668 A1 | 3/2015 | Nonogawa et al. | |
| 2015/0257483 A1 * | 9/2015 | Meschter | A43B 21/28 36/29 |
| 2017/0086532 A1 * | 3/2017 | Youngs | B32B 5/32 |
| 2018/0125160 A1 * | 5/2018 | Dojan | A43B 13/20 |
| 2018/0213886 A1 * | 8/2018 | Connell | A43B 13/188 |
| 2018/0255871 A1 * | 9/2018 | Conway | A43B 13/186 |
| 2018/0332925 A1 * | 11/2018 | Bailey | A43B 13/20 |
| 2018/0338575 A1 * | 11/2018 | Elder | B32B 27/306 |
| 2020/0359737 A1 | 11/2020 | Sung | |

FOREIGN PATENT DOCUMENTS

| | | |
|---|---|---|
| CN | 203676285 U | 7/2014 |
| CN | 104203029 A | 12/2014 |
| CN | 106455750 A | 2/2017 |
| CN | 107072349 A | 8/2017 |
| JP | 2008048894 A | 3/2008 |
| KR | 100230096 B1 | 11/1999 |
| TW | I611771 B | 1/2018 |
| WO | 2016144531 A1 | 9/2016 |

\* cited by examiner

DOMED MIDSOLE WITH STAGED COMPRESSIVE STIFFNESS

CROSS-REFERENCE TO RELATED APPLICATIONS

This application is a divisional of U.S. Nonprovisional application Ser. No. 15/983,512 which claims the benefit of priority to U.S. Provisional Application No. 62/510,000 filed May 23, 2017, and both of which are hereby incorporated by reference in their entirety.

TECHNICAL FIELD

The present teachings generally include a sole structure for an article of footwear including a midsole.

BACKGROUND

An article of footwear typically includes a sole structure configured to be located under a wearer's foot to space the foot away from the ground. Sole structures in athletic footwear are typically configured to provide cushioning, motion control, and/or resilience.

DESCRIPTION

Figure 1:
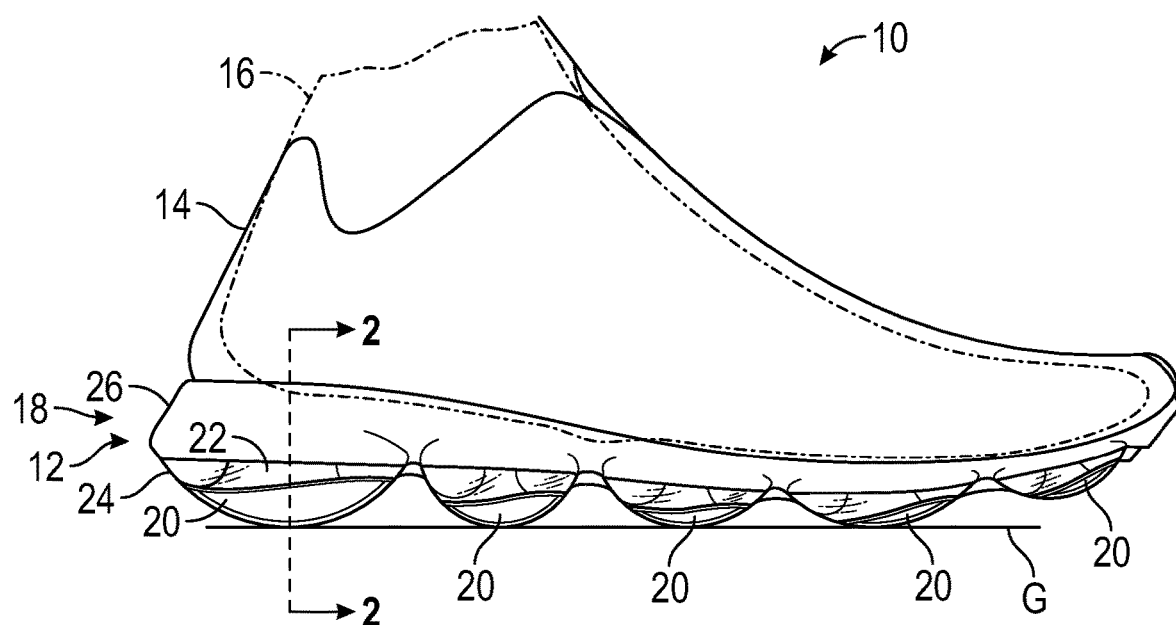
FIG. 1 is a schematic illustration in side view of an article of footwear having a sole structure.

An article of footwear includes a sole structure with a midsole that has multiple cushioning layers of different stiffness disposed relative to one another such that the midsole absorbs a dynamic compressive load due to impact with the ground in stages of progressive cushioning (referred to as staged or graded cushioning) according to the relative stiffness values of the layers. Underfoot loads are "dosed" or "staged" to the wearer, with each stage having a different effective stiffness. In one example, the midsole initially provides a low, linear rate of change of load to displacement (i.e., compressive stiffness), followed by a higher, possibly non-linear rate, and then a more rapid, exponentially increasing rate. The sole structure provides the graded cushioning while being lightweight and flexible. Moreover, various embodiments have exhibited an unloading behavior (i.e., behavior when the dynamic compressive force is removed) that provides significant energy return.

More specifically, a sole structure for an article of footwear comprises a midsole including a first cushioning layer, a second cushioning layer, and a third cushioning layer. The first cushioning layer has a central portion, and a peripheral portion surrounding the central portion. The first cushioning layer, the second cushioning layer, and the third cushioning layer are stacked with the second cushioning layer directly overlying the peripheral portion of the first cushioning layer, and the third cushioning layer overlying the second cushioning layer and directly overlying the central portion of the first cushioning layer. The first cushioning layer has a domed lower surface extending away from the second cushioning layer and the third cushioning layer and substantially centered under the central portion. For example, the first cushioning layer may have at least a partial dome or bubble shape, and the second cushioning layer may have a toroidal (e.g., donut) shape surrounding a portion of the dome shape.

In such an embodiment, the first cushioning layer absorbs the dynamic compressive load in series with the second cushioning layer at the peripheral portion of the first cushioning layer, and the first cushioning layer absorbs the dynamic compressive load in parallel with the second cushioning layer and in series with the third cushioning layer at the central portion of the first cushioning layer. Furthermore, the first cushioning layer and the second cushioning layer define a ground-facing outer surface of the midsole. The third cushioning layer may be entirely displaced from the ground-facing outer surface of the midsole by the first cushioning layer and the second cushioning layer. The second cushioning layer and the third cushioning layer define a foot-facing outer surface of the midsole. The first cushioning layer may be entirely displaced from the foot-facing outer surface of the midsole by the second cushioning layer and the third cushioning layer. Both of these embodiments sandwich at least a large portion of the second cushioning layer between the first and third cushioning layers.

The first cushioning layer has a first stiffness, the second cushioning layer has a second stiffness greater than the first stiffness, and the third cushioning layer has a third stiffness. A dynamic compressive load on the sole structure is absorbed by the first cushioning layer, the second cushioning layer, and the third cushioning layer in a sequence according to relative magnitudes of the first stiffness, the second stiffness, and the third stiffness. As used herein, "stiffness" is the rate of change of load to displacement in compression of a cushioning layer. A cushioning layer may have a constant stiffness (i.e., linear rate of change of load to displacement), a non-linear stiffness, such as an exponentially increasing rate of change of load to displacement in compression, or may have a rate that is initially linear and changes to non-linear or vice versa. The stiffness of the midsole may have an effective stiffness in a portion of the displacement range that is based on the stiffness values of more than one of the cushioning layers when two or more of the cushioning layers compress in series or in parallel.

In various embodiments, at least one of the first cushioning layer, the second cushioning layer, and the third cushioning layer may be foam, each one of the first cushioning layer, the second cushioning layer, and the third cushioning layer may be foam, or none of the first cushioning layer, the second cushioning layer, and the third cushioning layer may be foam. A layer that is not foam may instead be a sealed chamber that retains a gas at a predetermined pressure when in an unloaded state, such as at a specific inflation pressure or at ambient pressure. For example, such a sealed chamber may be defined by and bounded by two adjacent polymeric sheets that are impervious to the gas. A gas-filled sealed chamber is empty (i.e., "structure-less"), yet can provide cushioning when compressed, with significant weight reduction in comparison to most foams. As used herein, a "predetermined pressure" is at a predetermined reference temperature.

In an embodiment, the first cushioning layer includes a first sealed chamber retaining a gas at a first predetermined pressure in an unloaded state, and the second cushioning layer includes a second sealed chamber retaining a gas at a second predetermined pressure in the unloaded state higher than the first predetermined pressure.

The midsole may include a first polymeric sheet, a second polymeric sheet, and a third polymeric sheet, with the first sealed chamber bounded by the first polymeric sheet and the second polymeric sheet, and the second sealed chamber bounded by the second polymeric sheet and the third polymeric sheet. In such an embodiment, the second polymeric sheet and the third polymeric sheet are bonded to one another between the first sealed chamber and the third cushioning layer at a bond having an outer periphery with a closed shape. The second sealed chamber borders the outer periphery of the bond, and the domed lower surface is substantially centered under the bond. The second sealed chamber may be substantially annular. The third cushioning layer may be foam.

In various embodiments, the closed shape of the bond may be, for example, substantially oval, substantially circular, or an equilateral polygon. A bond that has any of these closed shapes helps to substantially center a domed lower surface of the first polymeric sheet under the bond. This also centers the dome shape relative to the second cushioning layer, which surrounds an outer periphery of the bond. Moreover, these closed shapes enable the bond to be disposed substantially level with an uppermost extent of the second sealed chamber when the sole structure is in an unloaded state, so that the second sealed chamber is presented as relatively flat at the foot-facing outer surface of the midsole. In some embodiments, the domed lower surface provides a relatively large amount of available vertical displacement of the first cushioning layer under dynamic compressive loading, prolonging the first stage of load absorption by the least stiff first cushioning layer, and the associated portion of the load versus displacement curve with the lowest rate.

In some embodiments, the sole structure further comprises an outsole secured to the domed lower surface of the first polymeric sheet. The outsole includes a central lug substantially centered under the domed lower surface of the first polymeric sheet and providing a ground contact surface of the sole structure. A width of the central lug is less than a width of the domed lower surface of the first polymeric sheet such that the central lug compresses a center of the domed lower surface of the first polymeric sheet under a compressive load.

The outsole may further comprise side lugs disposed adjacent to the central lug. The central lug may be lower than the side lugs under a first compressive load. However, under a second compressive load greater than the first compressive load, the first cushioning layer compresses, moving the side lugs level with the central lug, thereby increasing ground contact area of the outsole.

In an embodiment, the first polymeric sheet and the second polymeric sheet are bonded to one another along an outer peripheral portion of an underside of the second sealed chamber such that the first sealed chamber underlies the second sealed chamber only inward of the outer peripheral portion. This bond reduces the height of the first sealed chamber at the domed portion under the bond. A reduced height may enhance the stability of the first cushioning layer. By varying the size of this bond along an outer peripheral portion of an underside of the second sealed chamber, the height and thus the amount of displacement available in the first cushioning layer can be tuned, affecting the length of the portion of the load versus displacement curve associated with compression of the first cushioning layer.

In another embodiment, a tether element is disposed in the second sealed chamber. The tether element includes a first plate bonded to an inner surface of the third polymeric sheet, a second plate bonded to an inner surface of the second polymeric sheet and a plurality of tensile elements connecting the first plate to the second plate and suspended across the second sealed chamber. The first sealed chamber may be disposed between the second sealed chamber and the ground-facing outer surface of the midsole.

A sole structure for an article of footwear may comprise a midsole having a first cushioning layer with a domed lower surface, a second cushioning layer overlying the first cushioning layer and disposed at least partially in series with the first cushioning layer relative to a dynamic compressive load applied on the midsole, and a third cushioning layer overlying the first cushioning layer and the second cushioning layer and disposed at least partially in series with the first cushioning layer and at least partially in series with the second cushioning layer relative to the dynamic compressive load. The first cushioning layer has a first stiffness, the second cushioning layer has a second stiffness greater than the first stiffness, and the third cushioning layer has a third stiffness less than the second stiffness.

In an embodiment, the midsole includes a first polymeric sheet, a second polymeric sheet, and a third polymeric sheet. The first cushioning layer includes a first sealed chamber bounded by the first polymeric sheet and the second polymeric sheet and retaining a gas at a first predetermined pressure in an unloaded state. The second cushioning layer includes a second sealed chamber bounded by the second polymeric sheet and the third polymeric sheet and retaining a gas at a second predetermined pressure in the unloaded state. The second predetermined pressure is higher than the first predetermined pressure. In such an embodiment, the second polymeric sheet and the third polymeric sheet may be bonded to one another between the first sealed chamber and the third cushioning layer at a bond having a substantially circular outer periphery. The second sealed chamber borders the outer periphery of the bond and is substantially annular. The first sealed chamber directly underlies the bond. The first polymeric sheet and the second polymeric sheet are bonded to one another along an outer peripheral portion of an underside of the second sealed chamber such that the first sealed chamber underlies the second sealed chamber only inward of the outer peripheral portion.

The above features and advantages and other features and advantages of the present teachings are readily apparent from the following detailed description of the modes for carrying out the present teachings when taken in connection with the accompanying drawings.

Figure 9:
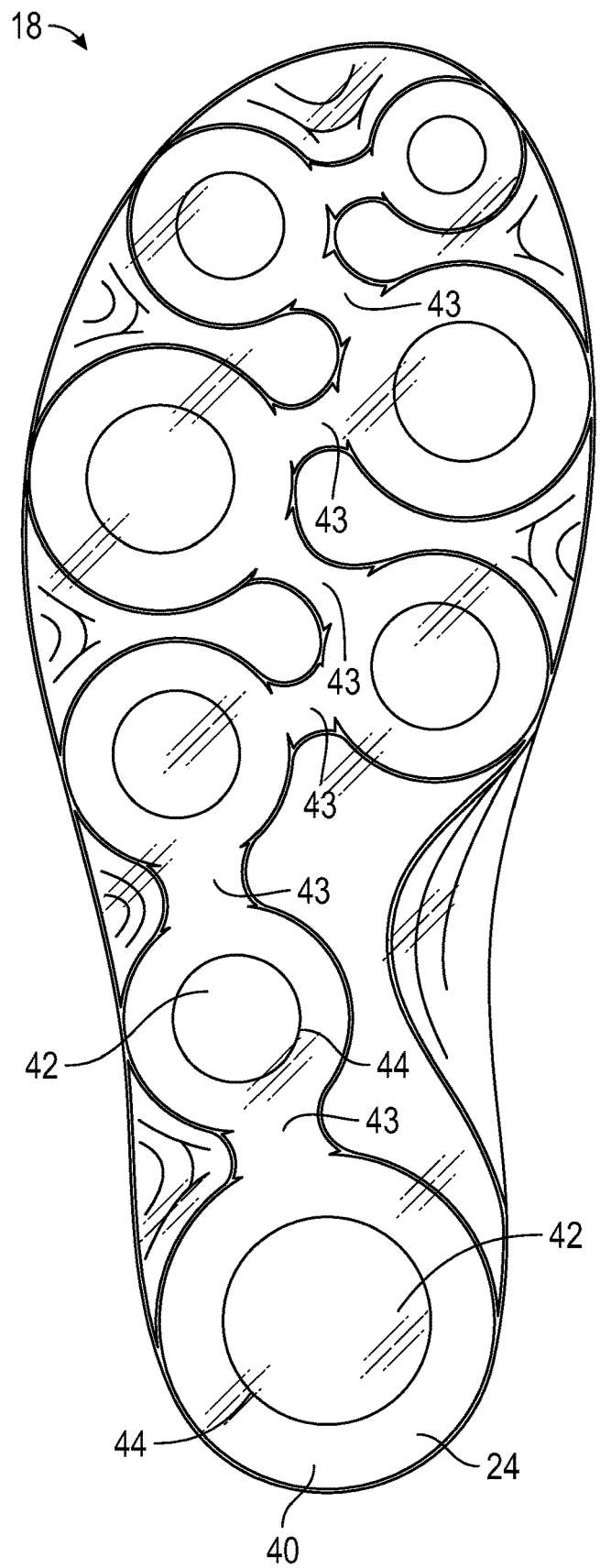
FIG. 9 is a schematic illustration in bottom view of the midsole of the article of footwear of FIG. 1.

Referring to the drawings wherein like reference numbers refer to like components throughout the views, FIG. 1 shows an article of footwear 10. The article of footwear includes a sole structure 12 and an upper 14 secured to the sole structure 12. The upper 14 is configured to receive and retain a foot 16 so that the foot 16 is supported on the sole structure 12 with the sole structure 12 positioned below the foot 16, and between the foot 16 and the ground, which is represented by a ground surface G. As discussed herein, the sole structure 12 includes a midsole 18 that has multiple cushioning layers disposed relative to one another such that the midsole 18 absorbs a dynamic compressive load (such as due to impact with the ground) in stages of progressive cushioning in a sequence according to the relative stiffness of the cushioning layers. As used herein, "stiffness" of a cushioning layer is the ratio of change in compressive load (e.g., force in Newtons) to displacement of the cushioning layer (e.g., displacement in millimeters along the axis of the compressive load). An outsole 20 is secured to the midsole 18 as described herein. FIG. 9 is a bottom view of the midsole 18, with the outsole 20 removed.

Figure 2:
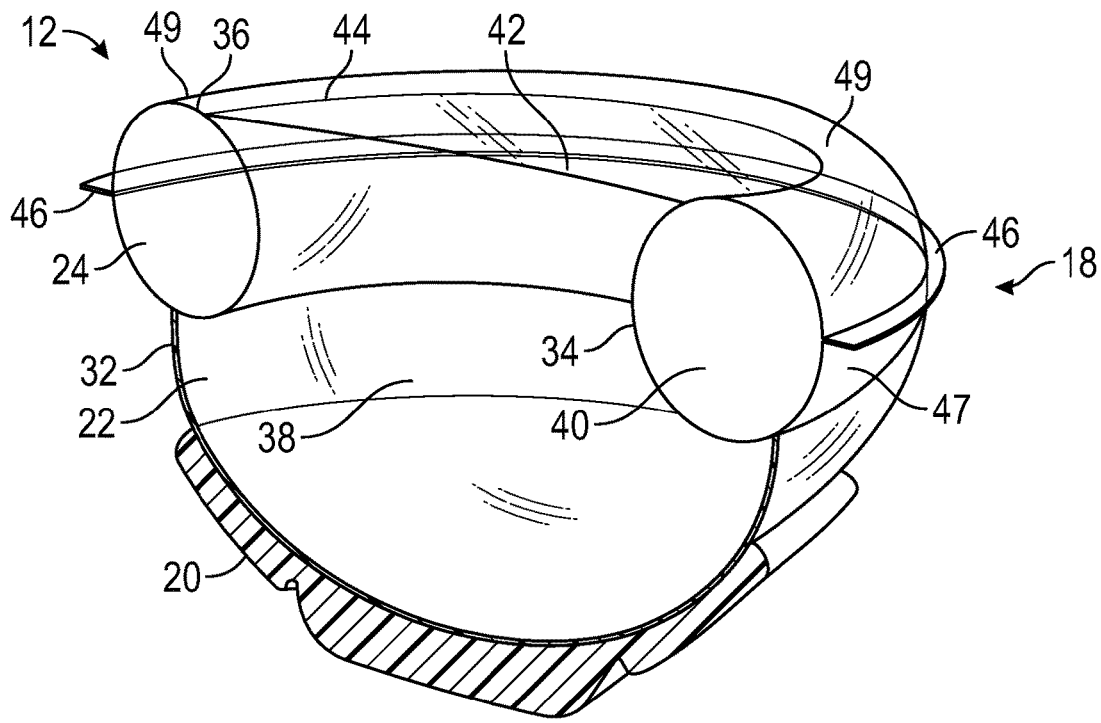
FIG. 2 is a schematic illustration in cross-sectional perspective view of a portion of the sole structure of the article of footwear of FIG. 1 taken at lines 2-2 in FIG. 1.
Figure 3:
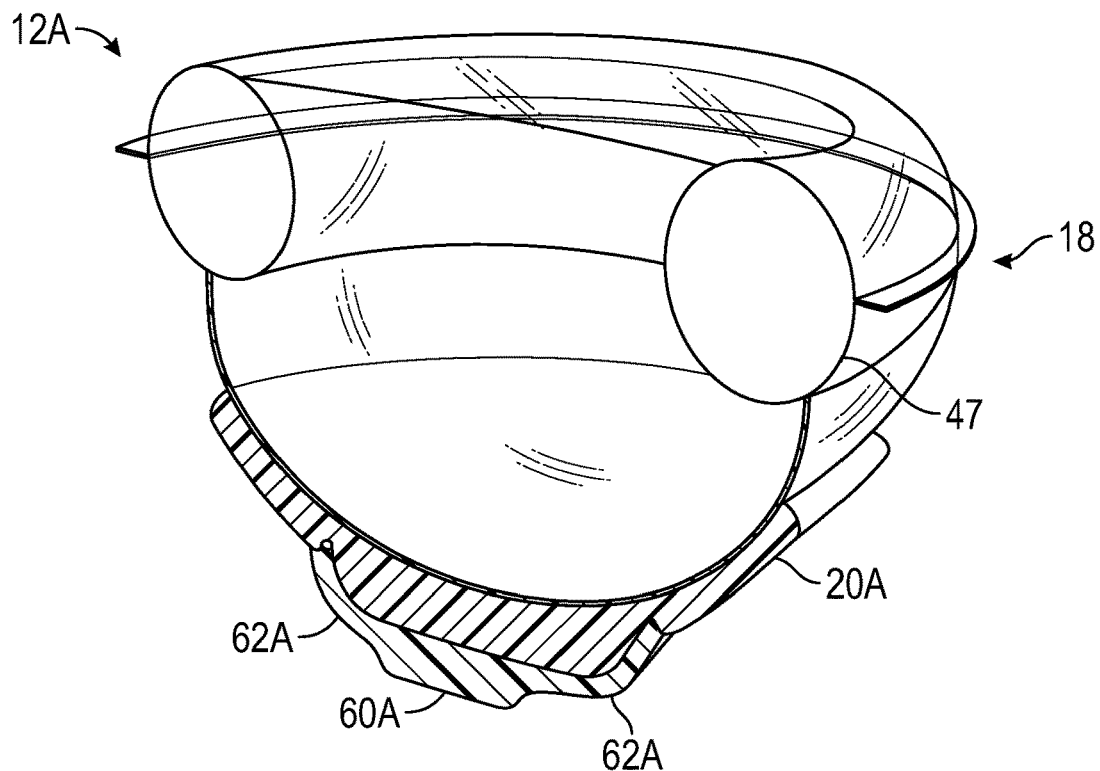
FIG. 3 is a schematic illustration in cross-sectional perspective view of a portion of an alternative sole structure for the article of footwear of FIG. 1.
Figure 4:
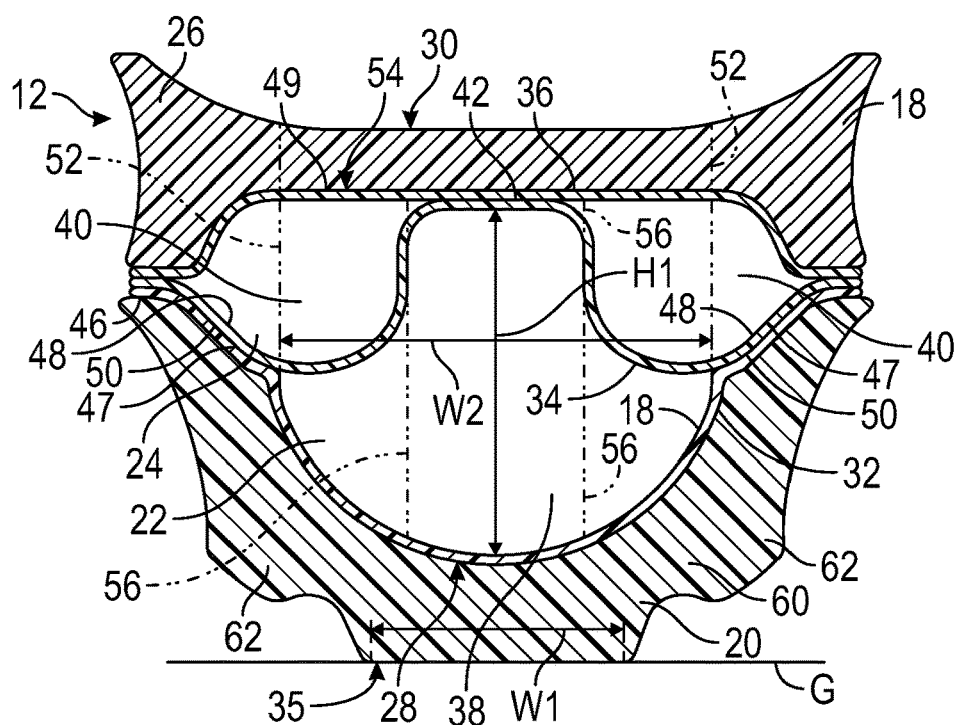
FIG. 4 is a schematic illustration in cross-sectional view of the portion of the sole structure of FIG. 2 showing a third cushioning layer.

With reference to FIGS. 2 and 4, the midsole 18 includes a first cushioning layer 22, a second cushioning layer 24, and a third cushioning layer 26. The first cushioning layer 22, the second cushioning layer 24, and the third cushioning layer 26 are stacked with the second cushioning layer 24 partially overlying the first cushioning layer 22, and the third cushioning layer 26 overlying the second cushioning layer 24 when the article of footwear 10 is worn on a foot 16 so that the sole structure 12 is disposed with the third cushioning layer 26 nearest the foot 16 and the first cushioning layer 22 nearest the ground surface G, such as when the outsole 20 is in contact with the ground surface G. The first cushioning layer 22 includes a ground-facing outer surface 28 of the midsole 18, and the third cushioning layer 26 includes a foot-facing outer surface 30 of the midsole 18.

The midsole 18 includes a first polymeric sheet 32, a second polymeric sheet 34, and a third polymeric sheet 36. The first cushioning layer 22 is formed by the first and second polymeric sheets 32, 34, which form and define a first sealed chamber 38 bounded by the first polymeric sheet 32 and the second polymeric sheet 34. The second cushioning layer 24 is formed by the second polymeric sheet 34 and the third polymeric sheet 36, which form and define a second sealed chamber 40 bounded by the second polymeric sheet 34 and the third polymeric sheet 36.

The first, second, and third polymeric sheets 32, 34, 36 are a material that is impervious to gas, such as air, nitrogen, or another gas. This enables the first sealed chamber 38 to retain a gas at a first predetermined pressure, and the second sealed chamber 40 to retain a gas at a second predetermined pressure. As is apparent from FIGS. 1 and 9, the first and second sealed chambers 38, 40 of the midsole 18 include a plurality of pods or portions, which may or may not be fluidly interconnected, and one of which is shown in FIG. 2. A third cushioning layer 26 of the midsole 18 is removed in FIG. 2. FIG. 4 shows the same portion of the sole structure 12 as FIG. 2, but with the third cushioning layer 26 included. Having the first sealed chamber 38 in multiple separate sub-chambers (i.e., also referred to as pods) not in fluid communication with one another or with the second sealed chamber or chambers 40 allows separate, discrete, first sealed chambers 38 to be optimized in geometry and pressure for various areas of the foot. For example, the various pods of the first and second sealed chambers 38, 40 can be customized in number, size, location, and fluid pressure for a foot map of pressure loads of a specific wearer, or for a population average of wearers of the particular size of footwear. Separate pods also enhance flexibility of the midsole 18 as areas between pods are of reduced thickness, as is apparent in the side view of FIG. 1, and thus reduce bending stiffness of the midsole 18. For example, areas of webbing (also referred to herein as bonds), best shown in FIG. 9, where the first and second polymeric sheets 32, 34 are bonded to one another between the domed first chambers 38 of adjacent pods, are of reduced thickness. The areas between pods function as flex grooves and can be disposed at desired flex regions of the midsole 18. In FIG. 9, channels 43 are shown that connect the second chambers 40 of each pod for fluid communication with one another.

The polymeric sheets 32, 34, 36 can be formed from a variety of materials including various polymers that can resiliently retain a fluid such as air or another gas. Examples of polymer materials for polymeric sheets 32, 34, 36 include thermoplastic urethane, polyurethane, polyester, polyester polyurethane, and polyether polyurethane. Moreover, the polymeric sheets 32, 34, 36 can each be formed of layers of different materials. In one embodiment, each polymeric sheet 32, 34, 36 is formed from thin films having one or more thermoplastic polyurethane layers with one or more barriers layer of a copolymer of ethylene and vinyl alcohol (EVOH) that is impermeable to the pressurized fluid contained therein as disclosed in U.S. Pat. No. 6,082,025, which is incorporated by reference in its entirety. Each polymeric sheet 32, 34, 36 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The polymeric sheets 32, 34, 36 may also each be a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Additional suitable materials for the polymeric sheets 32, 34, 36 are disclosed in U.S. Pat. Nos. 4,183,156 and 4,219,945 to Rudy which are incorporated by reference in their entireties. Further suitable materials for the polymeric sheets 32, 34, 36 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the polymeric sheets 32, 34, 36, engineering properties such as tensile strength, stretch properties, fatigue characteristics, dynamic modulus, and loss tangent can be considered. The thicknesses of polymeric sheets 32, 34, 36 can be selected to provide these characteristics.

The first and second sealed chambers 38, 40 are not in fluid communication with one another. Stated differently, the first and second sealed chambers 38, 40 are sealed from one another by the second polymeric sheet 34. This allows the first and second sealed chambers 38, 40 to retain gas at different pressures. The first sealed chamber 38 retains gas at a first predetermined pressure when the midsole 18 in an unloaded state, and the second sealed chamber 40 retains gas at a second predetermined pressure in the unloaded state. The unloaded state is the state of the midsole 18 when it is not under either steady state or dynamic loading. For example, the unloaded state is the state of the midsole 18 when it is not bearing any loads, such as when it is not on the foot 16. The second predetermined pressure can be different than the first predetermined pressure. In the embodiment shown, the second predetermined pressure is higher than the first predetermined pressure. In one non-limiting example, the first predetermined pressure is 7 pounds per square inch (psi), and the second predetermined pressure is 20 psi. The predetermined pressures may be inflation pressures of the gas to which the respective sealed chambers 38, 40 are inflated just prior to finally sealing the chambers 38, 40. The lowest one of the predetermined pressures, such as the first predetermined pressure, may be ambient pressure rather than an inflated pressure.

In the embodiment shown, the third cushioning layer 26 is foam. By way of non-limiting example, the foam of the third cushioning layer 26 may be at least partially a polyurethane foam, a polyurethane ethylene-vinyl acetate (EVA) foam, and may include heat-expanded and molded EVA foam pellets.

The first cushioning layer 22 has a first stiffness K1 that is determined by the properties of the first and second polymeric sheets 32, 34, such as their thicknesses and material, and by the first predetermined pressure in the first sealed chamber 38. The second cushioning layer 24 has a second stiffness K2 that is determined by the properties of the second and third polymeric sheets 34, 36, such as their thicknesses and material, and by the second predetermined pressure in the second sealed chamber 40. The third cushioning layer 26 has a third stiffness K3 that is dependent on the properties of the foam material, such as the foam density. The stiffness K1, K2, and/or K3 need not be linear throughout a stage of compression. For example, the stiffness K3 of the third cushioning layer may increase exponentially with displacement.

Figure 5:
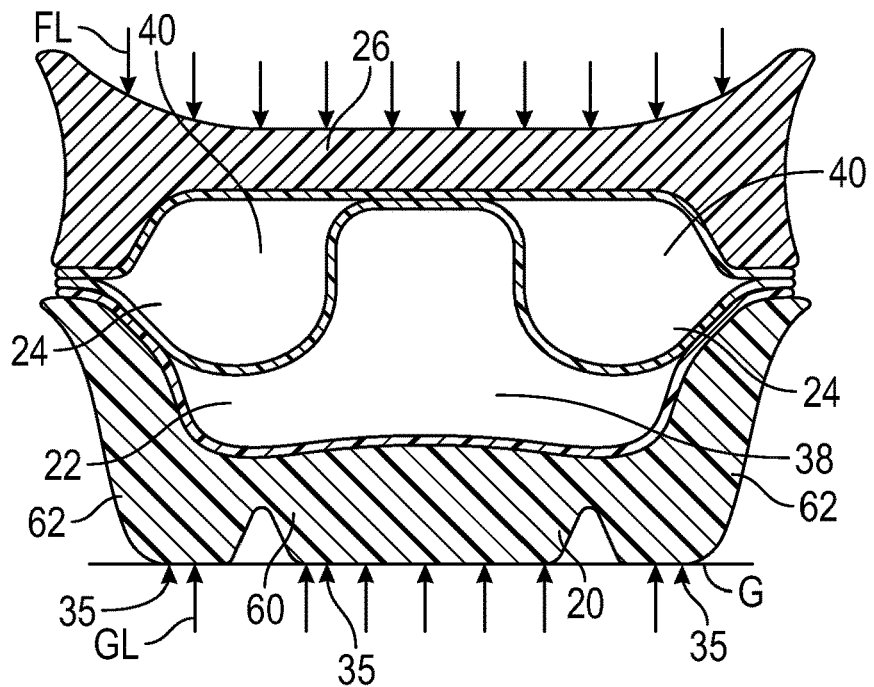
FIG. 5 is a schematic illustration in cross-sectional view of the portion of the sole structure of FIG. 4 in a first stage of compression.
Figure 6:
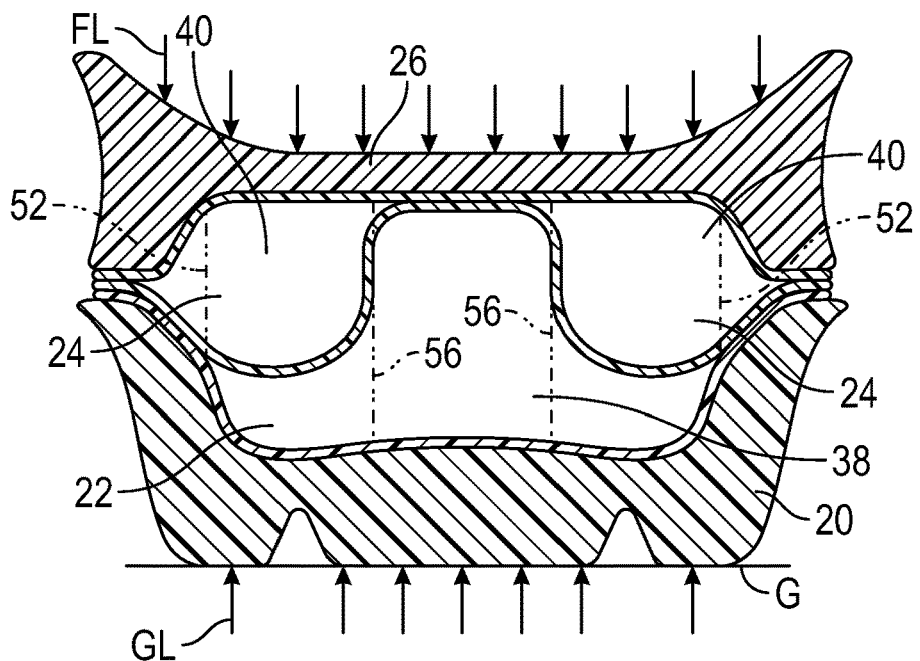
FIG. 6 is a schematic illustration in cross-sectional view of the portion of the sole structure of FIGS. 4-5 in a second stage of compression.
Figure 7:
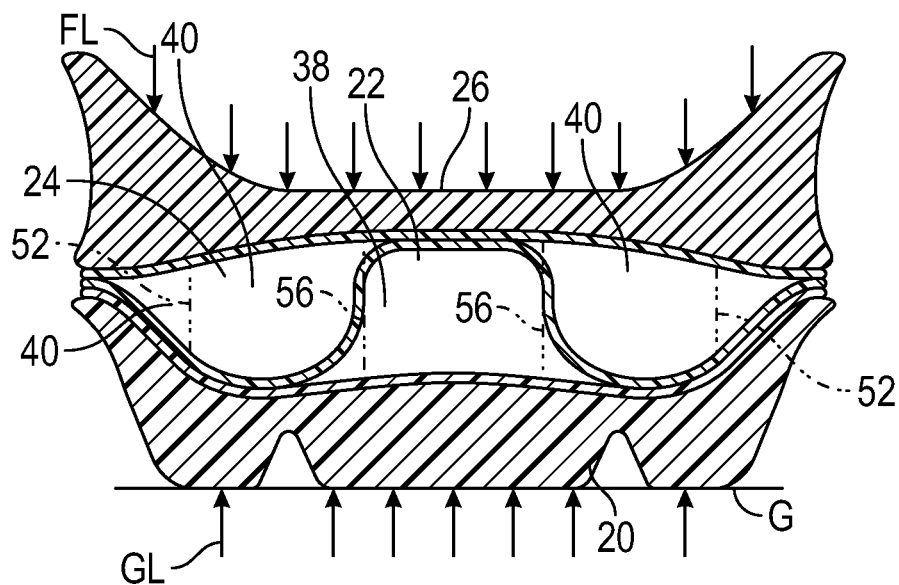
FIG. 7 is a schematic illustration in cross-sectional view of the portion of the sole structure of FIGS. 4-6 in a third stage of compression.
Figure 8:
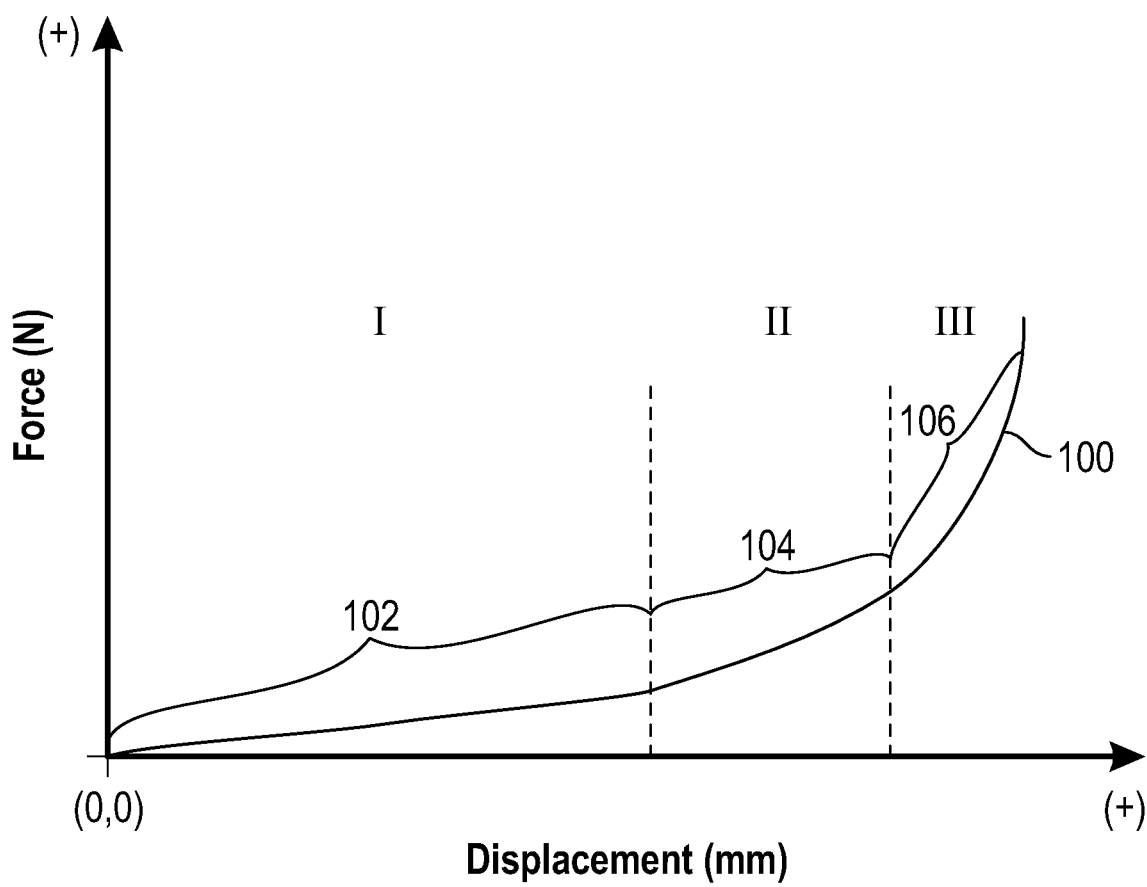
FIG. 8 is a plot of force versus displacement during dynamic compressive loading of the portion of the sole structure of FIG. 2.

A dynamic compressive load on the sole structure 12 is due to an impact of the article of footwear 10 with the ground, as indicated by a footbed load FL of a person wearing the article of footwear 10 and an opposite ground load GL. The footbed load FL is shown in FIGS. 5-7 as a series of arrows acting on the foot-facing outer surface 30, and the ground load GL is shown as a series of arrows acting on a ground contact surface 35 of the outsole 20. The footbed load FL is represented by all of the downward arrows on the foot-facing outer surface 30. The ground load GL is represented by all of the upward arrows on the ground contact surface 35. The dynamic compressive load is absorbed by the first cushioning layer 22, the second cushioning layer 24, and the third cushioning layer 26 in a sequence according to increasing magnitudes of the first stiffness K1, the second stiffness K2, and the third stiffness K3 from least stiff to most stiff. In the embodiment shown, the stiffness of the cushioning layers 22, 24, 26 increase in the following order: first stiffness K1, third stiffness K3, and second stiffness K2, and the dynamic compressive load is thus absorbed by the cushioning layers in the following order: first cushioning layer, 22, third cushioning layer 26, and second cushioning layer 24 but any combination of relative pressures is possible.

The second polymeric sheet 34 and the third polymeric sheet 36 are bonded to one another between the first sealed chamber 38 and the third cushioning layer 26 at a bond 42 (also referred to herein as webbing) having an outer periphery 44 with a closed shape. In the embodiment shown, the closed shape is substantially circular, as best shown in the bottom view of FIG. 9, where the bond 42 is visible through the transparent first sheet 32. In each of the embodiments of FIGS. 1-21 and 26-36, the polymeric sheets are indicated as substantially transparent. Alternatively, any or all of the polymeric sheets could instead by opaque. The second sealed chamber 40 borders the outer periphery 44 of the bond 42. All three of the first polymeric sheet 32, the second polymeric sheet 34, and the third polymeric sheet 36 are bonded to one another at a peripheral flange 46 at an outer periphery of the midsole 18 as shown in FIG. 4. The bond 42 is disposed substantially level with an uppermost extent 49 of the second sealed chamber 40 when the sole structure 12 is unloaded, as indicated in FIGS. 2 and 4. At the time of bonding the second and third polymeric sheets 34, 36 at the bond 42, all of the polymeric sheets 32, 34, 36, are in the initial, flat stacked state. The bond 42 can be positioned at the uppermost extent 49 of the second sealed chamber 40 by inflating the second sealed chamber 40 prior to inflation of the first sealed chamber 38, and at a higher inflation pressure than the first sealed chamber 38. When inflation occurs in this order with these relative inflation pressures, the bond 42 will roll upward from a position substantially level with the flange 46 to the position shown in FIGS. 2 and 4 as the first sealed chamber 38 is inflated and sealed. The third cushioning layer 26 is thereafter bonded to the upper surface 54 of the third polymeric sheet 36.

With the bond 42 disposed substantially level with an uppermost extent 49 of the second sealed chamber 40, a relatively flat upper surface 54 is presented to the third cushioning layer 26 at the uppermost extent 49 of the second cushioning layer 24. This helps to enable a relatively flat foot-facing outer surface 30 of the midsole 18 if such is desired. For example, the pod illustrated in FIGS. 2 and 4 extends generally the width of the footbed at a heel portion of the sole structure 12, as is evident in FIG. 9. Because the bond 42 is higher than the flange 46, there is no depression or central cavity between the uppermost extent 49 and a top surface of the bond 42. In other embodiments, the bond 42 need not be level with the uppermost extent 49, in which case a cavity between the bond 42 and the uppermost extent 49 can be left as a void at ambient pressure under the third cushioning layer 26, or can be filled by the third cushioning layer 26.

Figure 10:
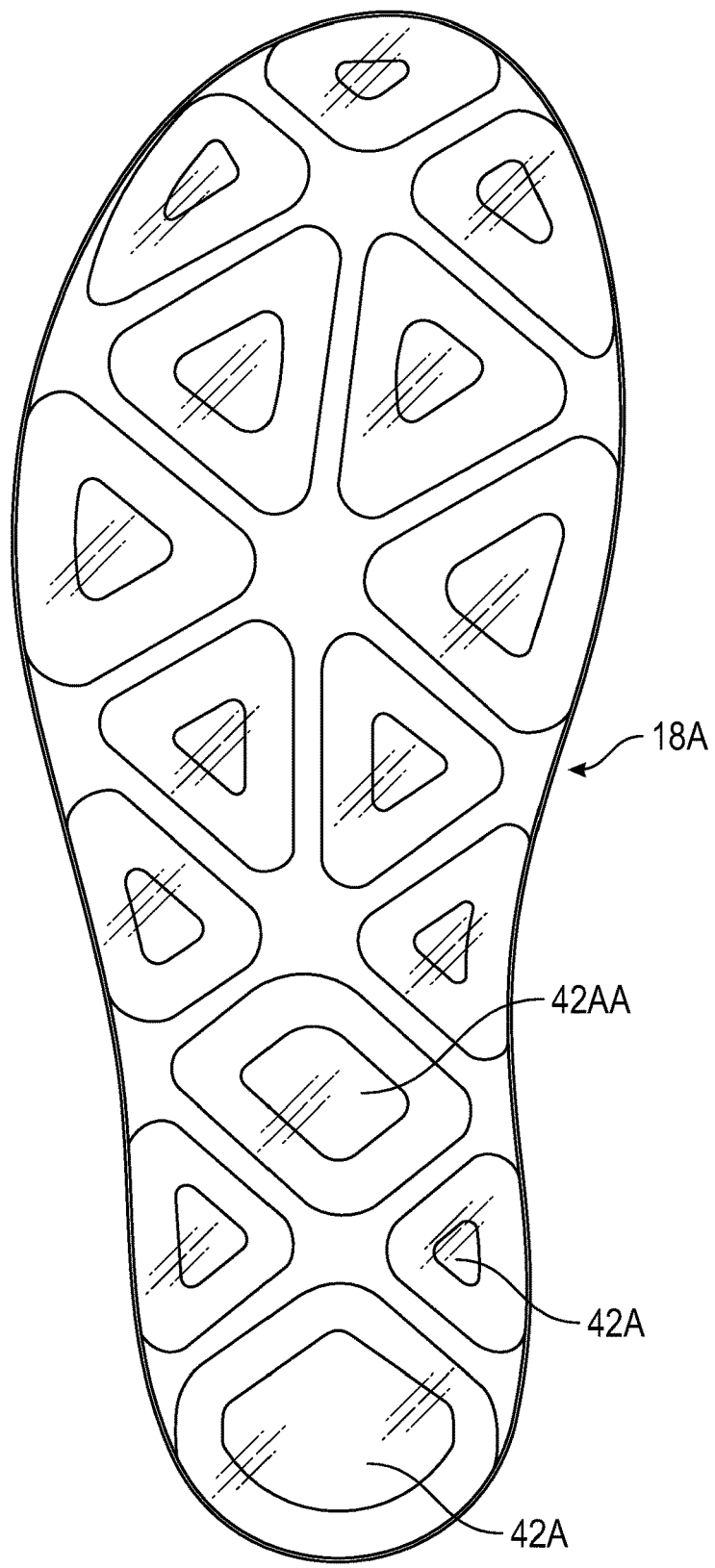
FIG. 10 is a schematic illustration in bottom view of an alternative midsole for the article of footwear of FIG. 1.
Figure 11:
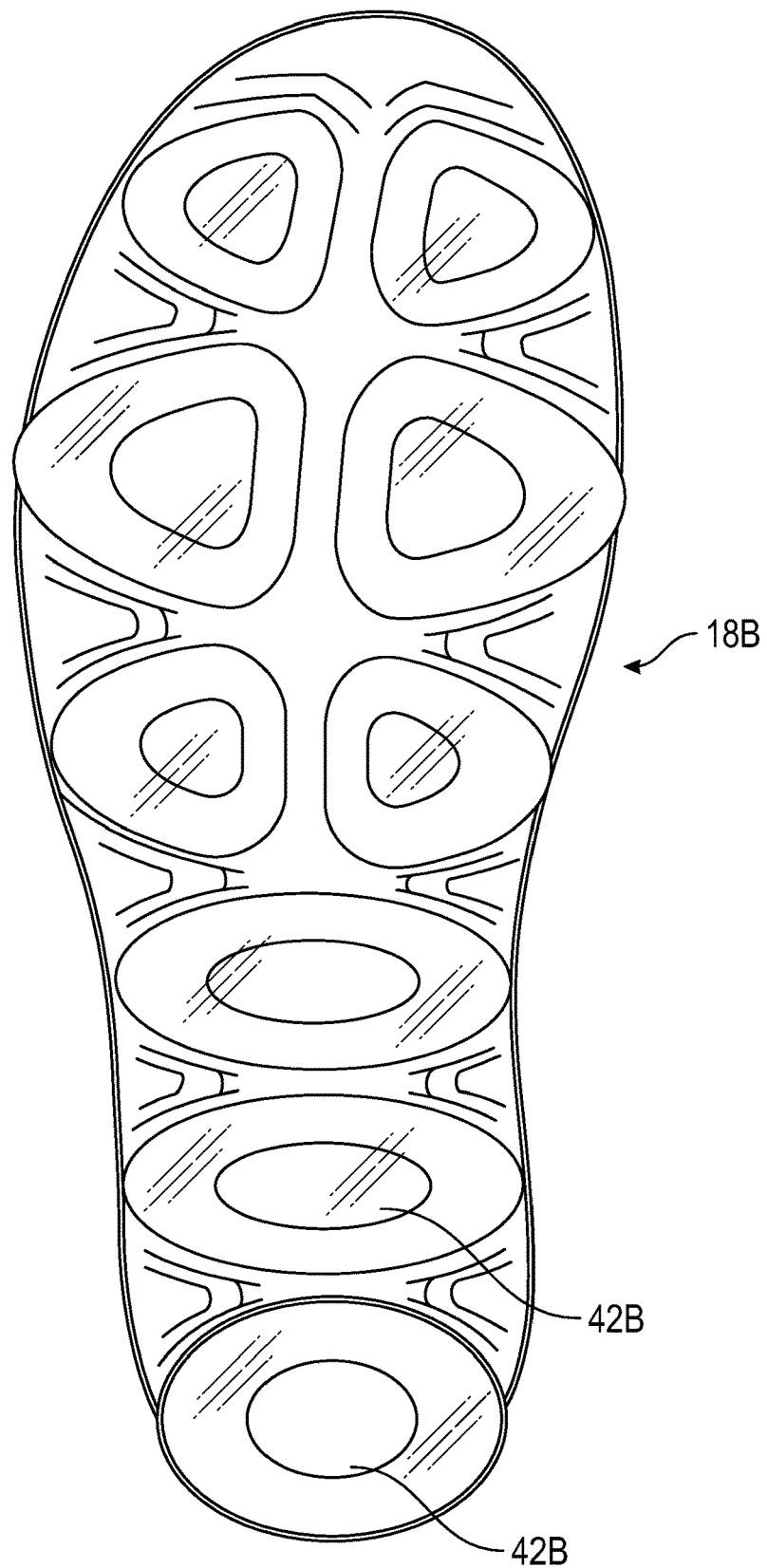
FIG. 11 is a schematic illustration in bottom view of an alternative midsole for the article of footwear of FIG. 1.
Figure 12:
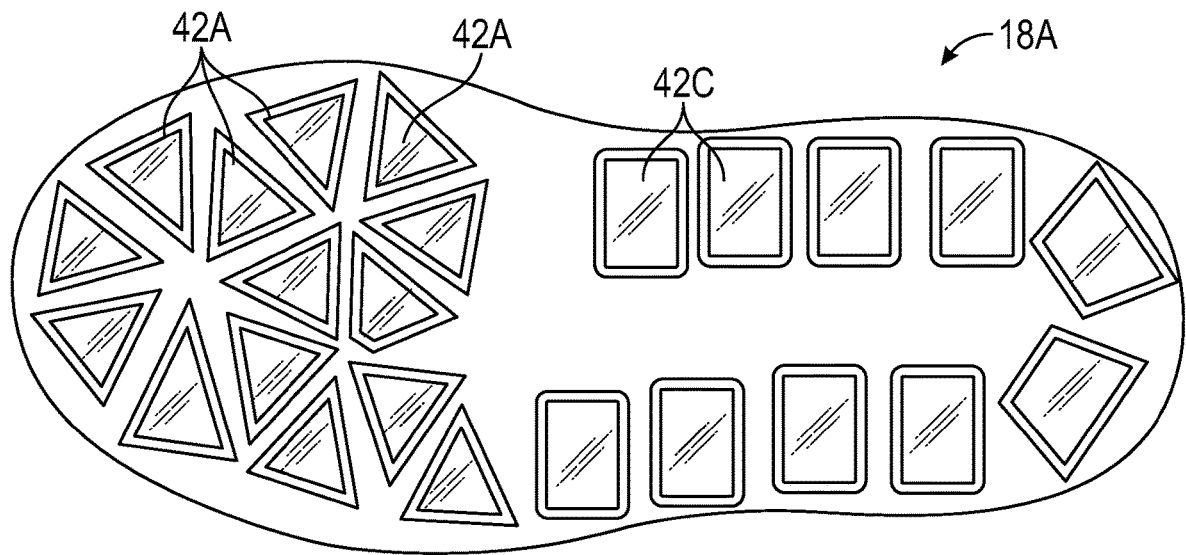
FIG. 12 is a schematic illustration in bottom view of an alternative midsole for the article of footwear of FIG. 1.
Figure 13:
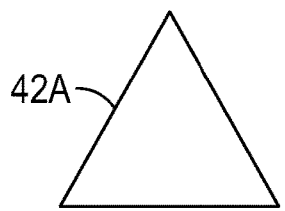
FIG. 13 is a schematic illustration in plan view of an embodiment of webbing in a midsole for the article of footwear of FIG. 1.
Figure 14:
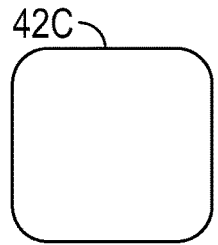
FIG. 14 is a schematic illustration in plan view of an embodiment of webbing in a midsole for the article of footwear of FIG. 1.
Figure 15:
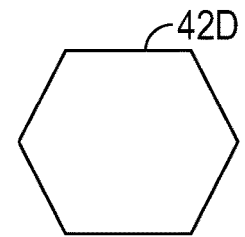
FIG. 15 is a schematic illustration in plan view of an embodiment of webbing in a midsole for the article of footwear of FIG. 1.
Figure 16:
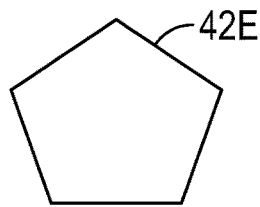
FIG. 16 is a schematic illustration in plan view of an embodiment of webbing in a midsole for the article of footwear of FIG. 1.
Figure 17:
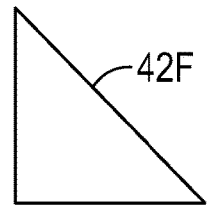
FIG. 17 is a schematic illustration in plan view of an embodiment of webbing in a midsole for the article of footwear of FIG. 1.

Although the bond 42 is shown as substantially circular, in other embodiments, the closed shape may be substantially oval, as shown by bond 42B in the alternative midsole 18B of FIG. 11, or may be an equilateral polygon, as shown by the substantially triangular bonds 42A, and the substantially rectangular bond 42AA of the alternative midsole 18A of FIG. 10. A number of possible closed-shaped bonds that are equilateral polygons are shown in FIGS. 13-16. These closed shapes are a triangular bond 42A (FIG. 13) that is substantially an isosceles triangle, a substantially square bond 42C (FIG. 14), a hexagonal bond 42D (FIG. 15), and a pentagonal bond 42E (FIG. 16). A right triangular bond 42F of FIG. 17 is not equilateral, but may also be suitable for the purposes of the bond described herein. It should be appreciated that each of the closed shapes may have rounded corners. Equilateral closed shapes are relatively easy to dispose closely adjacent one another in various orientations to cover select portions of a midsole, as illustrated by midsole 18A shown from below in FIG. 12. Each bond of FIG. 12 is surrounded at an outer periphery by an annular second cushioning layer having substantially the same shape as the bond which it surrounds.

A bond that has any of these closed shapes also enables the first polymeric sheet 32 to have a ground-facing outer surface 28 that is a domed lower surface such as shown in FIG. 4. The unrestrained portion of the first sealed chamber 38 tends to adopt the domed shape due to the force of the internal gas pressure on the inner surfaces of the polymeric sheets 32, 34 bounding the chamber 38.

Selection of the shape, size, and location of various bond portions of a midsole, such as the midsole 18, enables a desired contoured outer surface of the finished midsole. Prior to bonding at the bond 42, at the flange 46, and at the bond 47 discussed below, the polymeric sheets 32, 34, 36 are stacked, flat sheets. Anti-weld material may be ink-jet printed at all selected locations on the sheets where bonds are not desired. For example, the anti-weld material may be printed on both sides of the second polymeric sheet 34 and/or on the upper surface of the first polymeric sheet 32, and the upper surface of the second polymeric sheet 34. The stacked, flat polymeric sheets are then heat pressed to create bonds between adjacent sheets on all adjacent sheet surfaces except for where anti-weld material was applied. No radio frequency welding is necessary.

Once bonded, the polymeric sheets 32, 34, 36 remain flat, and take on the contoured shape only when the chambers 38, 40 are inflated and then sealed. The polymeric sheets 32, 34, 36 are not thermoformed. Accordingly, if the inflation gas is removed, and assuming other components are not disposed in any of the sealed chambers (e.g., such as tether elements of FIGS. 24-27), and the polymeric sheets are not yet bonded to other components such as the outsole 20 or the cushioning layer 26, the polymeric sheets 32, 34, 36 will return to their initial, flat state. The outsole 20 is bonded to the ground-facing outer surface 28 by adhesive or otherwise only after inflation and sealing of the first sealed chamber 38.

In each embodiment of FIGS. 1-17, the second sealed chamber 40 is an annulus (i.e., is substantially annular) that has the equilateral shape of the bond that it borders. In the embodiment of FIG. 2, the second chamber 40 is a ring-shaped annulus (i.e., generally toroidal). A bond that has one of the closed shapes discussed herein enables the ground-facing outer surface 28 of the underlying first polymeric sheet 32 to adopt a domed shape that is substantially centered under the bond, as shown by the domed ground-facing outer surface 28 (also referred to as a domed lower surface 28 or domed portion 28) centered under bond 42 and extending away from the second and third cushioning layers 24, 26. The domed lower surface 28 is thus also centered under and stabilized by the higher pressure second sealed chamber 40 of the second cushioning layer 24, which borders and surrounds the outer periphery 44 of the bond 42. A domed ground-facing outer surface provides a relatively large amount of vertical displacement of the first cushioning layer 22 under dynamic compression in comparison to a flat lower surface, prolonging the stage of load absorption by the first cushioning layer 22. The first stage of compression is represented by portion 102 of the load versus displacement curve 100 of FIG. 8 that represents the absorption of the dynamic compressive load by the first cushioning layer 22 with the first stiffness K1, which, in the embodiment of FIGS. 2 and 4-7 is the least stiff cushioning layer.

With reference to FIG. 4, a central portion of the first sealed chamber 38 directly underlies the third cushioning layer 26 as a bond 42 and a peripheral portion of the first sealed chamber 38 directly underlies a portion of the second sealed chamber 40. The central portion is between lines 56 and the peripheral portion is outward of lines 56. The first polymeric sheet 32 and the second polymeric sheet 34 are bonded to one another at a bond 47 along an outer peripheral portion 48 of an underside 50 of the second sealed chamber 40. Accordingly, the first sealed chamber 38 underlies the second sealed chamber 40 only inward of the outer peripheral portion 48 (i.e., only inward of the phantom lines 52). The portion of the second sealed chamber 40 overlying the first sealed chamber 38 is the annular portion between the phantom lines 52 and 56. The bond 47 reduces the height of the first sealed chamber 38 under the bond 42 to height H1, which is lower in comparison to a height that would exist if the first and second polymeric sheets 32, 34 were bonded to one another only at the flange 46. A reduced height of the first sealed chamber 38 may enhance the stability of the first cushioning layer 22 in that it may minimize tilting or tipping of the domed ground-facing outer surface 28 during compression. By varying the size of the bond 47, the height H1 and thus the amount of displacement available in compression of the first cushioning layer 22 can be tuned, affecting the domain of the low rate portion 102 of the load versus displacement curve 100 (i.e., the displacement over which the low rate portion 102 extends).

As discussed, the second sealed chamber 40 directly overlies only the peripheral portion of the first sealed chamber 38. The peripheral portion is the ring-shaped portion between the phantom lines 52 and 56. The third cushioning component 26 directly overlies only a remaining central portion of the first sealed chamber 38, i.e., that portion between (inward of) the phantom lines 56. With this relative disposition of the cushioning layers 22, 24, 26, the first cushioning layer 22 absorbs the dynamic compressive load in series with the second cushioning layer 24 and the third cushioning layer 26 at the peripheral portion of the first sealed chamber 38 (the portion between phantom lines 52 and 56), and the first cushioning layer 22 absorbs the dynamic compressive load in parallel with the second cushioning layer 24 and in series with the third cushioning layer 26 at the central portion of the first sealed chamber 38 (the portion between the phantom lines 56). As used herein, a cushioning layer directly overlies another cushioning layer when it is not separated from the cushioning layer by a cushioning portion of an intervening cushioning layer (i.e., a foam portion or a gas-filled sealed chamber). A bond that separates cushioning layers, such as bond 42, is not considered a cushioning portion of a cushioning layer. Accordingly, cushioning layers are considered to directly overlie one another when separated only by a bond. The first sealed chamber 38 directly underlies the bond 42 and the third cushioning layer 26 directly overlies the bond 42. The third cushioning layer 26 directly overlies the remaining portion of the first sealed chamber 38 as it is separated from the remaining portion of the first sealed chamber 38 only by bond 42 and not by the second sealed chamber 40.

As described, the second cushioning layer 24 is disposed at least partially in series with the first cushioning layer 22 relative to the dynamic compressive load FL, GL applied on the midsole 18. More specifically, the first cushioning layer 22 and the second cushioning layer 24 are in series relative to the load FL, GL between the phantom lines 52 and 56. The third cushioning layer 26 is disposed at least partially in series with the first cushioning layer 22 and at least partially in series with the second cushioning layer 24 relative to the dynamic compressive load FL, GL. More specifically, the third cushioning layer 26 is directly in series with the first cushioning layer 22 inward of the phantom lines 56. The first cushioning layer 22, the second cushioning layer 24, and the third cushioning layer 26 are in series relative to the dynamic compressive load FL, GL between the phantom lines 52 and 56. The third cushioning layer 26 is in series with the first cushioning layer 22 but not the second cushioning layer 24 between the phantom lines 56. The third cushioning layer 26 is in series with the second cushioning layer 24 but not the first cushioning layer 22 outward of the phantom lines 52.

The outsole 20 is secured to the domed lower surface 28 of the first polymeric sheet 32. The outsole 20 includes a central lug 60 substantially centered under the domed lower surface 28 of the first polymeric sheet 32 and serving as ground contact surface 35. The outsole 20 also includes one or more side lugs 62 disposed adjacent the central lug 60, i.e., surrounding the central lug 60 further up the sides of the domed ground-facing outer surface 28. The side lugs 62 are shorter than the central lug 60, and are configured such that they are not in contact with (i.e., are displaced from) the ground surface G when the sole structure 12 is unloaded, or is under only a steady state load or a dynamic compressive load not sufficiently large to cause compression of the first sealed chamber 38 to the state of FIG. 5. The lugs 60, 62 may be an integral portion of the outsole 20 as shown in FIGS. 2 and 4. In an alternative embodiment of a sole structure 12A shown in FIG. 3, an outsole 20A has a central lug 60A and side lugs 62A not integrally formed with but secured to the outsole 20A so that the outsole 20A with the lugs 60A, 62A functions as a unitary component and in a manner substantially the same as outsole 20 and lugs 60, 62.

The width W1 of the central lug 60 at the ground contact surface G is less than a width W2 of the domed lower surface 28 of the first polymeric sheet 32. Because the central lug 60 rests on the ground surface G, the reaction load (ground load GL) of the dynamic compressive load on the midsole 18 is initially applied through the central lug 60 toward a center of the domed lower surface 28 of the first polymeric sheet 32 where the maximum available displacement of the first sealed chamber 38 exists (i.e., at the greatest height H1 of the first sealed chamber 38). Because the central lug 60 is not as wide as the first sealed chamber 38, the first sealed chamber 38 may compress around the central lug 60.

The material of the outsole 20 in the embodiment shown has a fourth stiffness K4 (i.e., compressive stiffness) that is greater than the first stiffness K1 of the first cushioning layer 22, and may be more or less stiff than either or both of the second stiffness K2 of the second cushioning layer 24 and the third stiffness K3 of the third cushioning layer 26. For example, the outsole 20 could be a polymeric foam, such as an injected foam. In the embodiment shown, the fourth stiffness K4 is greater than the first stiffness K1, the second stiffness K2, and the third stiffness K3.

With reference to FIGS. 5-8, the stages of absorption of the dynamic compressive load FL, GL, represented by the footbed load FL and the ground load GL, are schematically depicted assuming that the first stiffness K1 of the first cushioning layer 22 is less than the second stiffness K2 of the second cushioning layer 24, and the third stiffness K3 of the third cushioning layer 26 is greater than the first stiffness K1 and less than the second stiffness K2. When the sole structure 12 initially receives the dynamic compressive load FL, GL, a first stage of compression I occurs, in which the least stiff first cushioning layer 22 is the first to compress, and compresses around the lug 60, changing the shape of the first sealed chamber 38 and compressing the gas in the first sealed chamber 38 such that the overall volume of the first sealed chamber 38 reduces relative to the state shown in FIGS. 2 and 4. The first stage of compression I is represented in FIG. 5. Compression of the second sealed chamber 40, the third cushioning layer 26, and the outsole 20 in the first stage of compression I, either does not occur or is only minimal. In the first stage of compression I shown in FIG. 5, the compression of the first sealed chamber 38 moves the side lugs 62 level with the central lug 60, causing the side lugs 62 to now form part of the ground contact surface 35 over which the ground load GL is spread, such that the ground contact surface 35 is larger in area compared to the steady-state loading of FIGS. 2 and 4. The midsole 18 has an effectively linear stiffness during the first stage of compression I, as represented by the portion 102 of the stiffness curve 100, with a numerical value substantially equal to the first stiffness K1.

In the second stage of compression II, shown in FIG. 6, the third cushioning layer 26 begins compressing, as indicated by the decreased thickness of the third cushioning layer 26 in comparison to FIG. 5. Compression of the first sealed chamber 38 of the first cushioning layer 22 may continue in series with compression of the third cushioning layer 26 in the second stage of compression II, assuming that the first cushioning layer 22 has not reached its maximum compression under the dynamic compressive load. The midsole 18 has an effective stiffness during the second stage of compression II that is dependent upon the third stiffness K3, and may be partially dependent on the first stiffness K1. The effective stiffness of the midsole 18 during the second stage of compression II is represented by the portion 104 of the stiffness curve 100 in FIG. 8.

In the third stage of compression III, shown in FIG. 7, the second cushioning layer 24 begins compressing by compression of the gas in the second sealed chamber 40. If compression of the first sealed chamber 38 has not yet reached its maximum compression under the dynamic compressive load, then compression of the first sealed chamber 38 will continue in series with the second cushioning layer 24, such as in the volume between phantom lines 52 and 56, and in parallel with the second cushioning layer 24 in the volume between lines 56. If compression of the third cushioning layer 26 has not already reached its maximum under the dynamic compressive load in the second stage of compression II, then compression of the third cushioning layer 26 will continue during the third stage of compression III in series with compression of the second cushioning layer 24 and in series with compression of the first cushioning layer 22, assuming compression of the first cushioning layer 22 has not already reached its maximum under the dynamic compressive load. The stiffness K4 of the outsole 20 can be selected such that compression of the outsole 20 will not begin until after the third stage of compression III.

The midsole 18 has an effective stiffness in the third stage of compression III that corresponds mainly with the relatively stiff second cushioning layer 24. Sealed chambers of compressible gas tend to quickly ramp in compression in a non-linear manner after an initial compression. The effective stiffness of the midsole 18 during the third stage of compression III is dependent upon the second stiffness K2, potentially to a lesser extent in part on the first stiffness K1 (if the first sealed chamber 38 continues compressing in series and/or parallel with the second sealed chamber 40), and potentially and to a lesser extent in part on the third stiffness K3 (if the foam of the cushioning layer 26 continues compressing in series and/or parallel with the second sealed chamber 40). The effective stiffness of the midsole 18 during the third stage of compression III is represented by the portion 106 of the stiffness curve 100 in FIG. 8. Because the third stage of compression III occurs after the first and second stages, it may coincide with movement of the article of footwear 10 to a dorsiflexed position in which an athlete is nearing a final "toe off" position (i.e., when completing a forward step or stride just prior to the article of footwear being lifted out of contact with the ground). Greater compressive stiffness may be desirable at toe off to provide the athlete with a sensation of connection to the ground, in comparison to at the initial impact when energy absorption and isolation from the ground is most desirable.

FIGS. 18-21 show another embodiment of a portion of a sole structure 212 with a midsole 218 within the scope of the present teachings. The sole structure 212 can be used as an alternative to the sole structure 12 of FIG. 1 in the article of footwear 10, and can be considered a cross-sectional view at the same location as FIG. 2 in the modified article of footwear.

The sole structure 212 has many of the same components as the sole structure 12 and identical reference numbers are used to refer to these components. A first cushioning layer 222, a second cushioning layer 224, and a third cushioning layer 226 are stacked with the second cushioning layer 224 overlying the first cushioning layer 222, and the third cushioning layer 226 overlying the second cushioning layer 224 when the sole structure 212 is in an article of footwear such as article of footwear 10 worn on the foot 16. The first and second polymeric sheets 32, 34 form and define a first sealed chamber 238 of the first cushioning layer 222. The second and third polymeric sheets 34, 36 form and define a second sealed chamber 240 of the second cushioning layer 224.

The second polymeric sheet 34 is not bonded to the third polymeric sheet 36 at a bond 42. Instead, a tether element 270 is disposed in the second sealed chamber 240. The tether element 270 includes a first plate 272 bonded to an inner surface 274 of the third polymeric sheet 36. The tether element 270 further includes a second plate 276 bonded to an inner surface 278 of the second polymeric sheet 34. A plurality of tensile elements 280 connect the first plate 272 to the second plate 276 and are suspended across the second sealed chamber 240. Only one row of tensile elements 280 is shown in the cross-sectional view of FIG. 18. However, multiple rows of tensile elements connect the plates 272, 276. Tether elements can provide desired responsiveness, such as disclosed in U.S. Pat. No. 8,479,412 to Peyton et al., which is incorporated by reference herein in its entirety.

The first cushioning layer 222 has a first stiffness K1 that is determined by the properties of the first and second polymeric sheets 32, 34, such as their thicknesses and material, and by the first predetermined pressure in the first sealed chamber 238. The second cushioning layer 224 has a second stiffness K2 that is determined by the properties of the second and third polymeric sheets 34, 36, such as their thicknesses and material, and by the second predetermined pressure in the second sealed chamber 240. The third cushioning layer 226 has a third stiffness K3 that is dependent on the properties of the foam material, such as the foam density.

Figure 18:
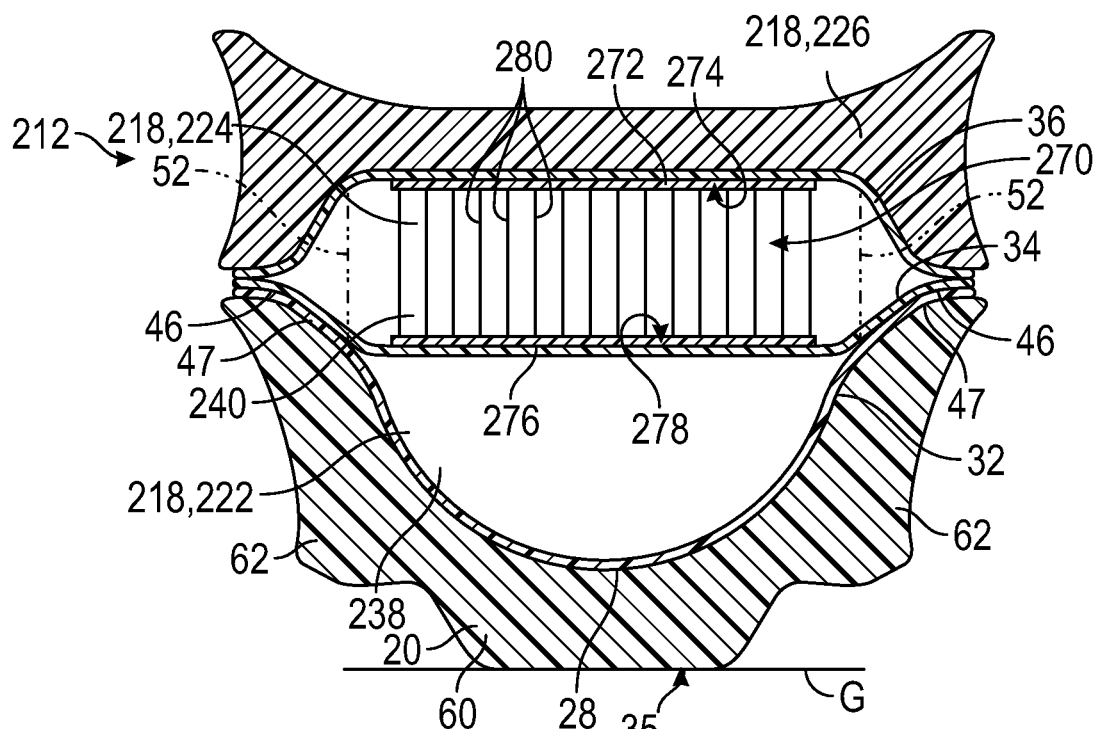
FIG. 18 is a schematic illustration in cross-sectional view of a portion of an alternative embodiment of a sole structure for an article of footwear.
Figure 19:
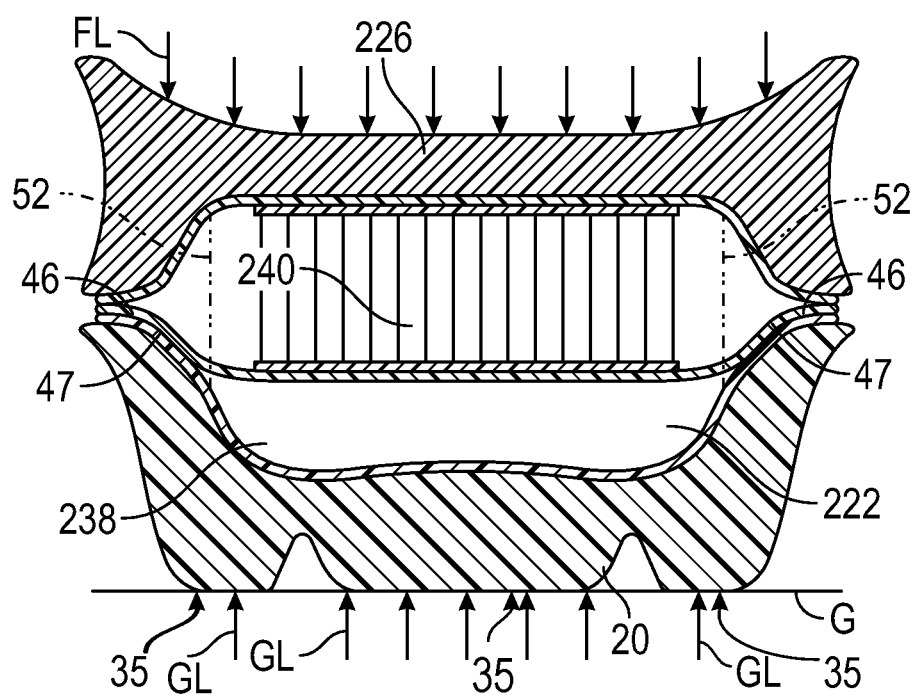
FIG. 19 is a schematic illustration in cross-sectional view of the portion of the sole structure of FIG. 18 in a first stage of compression.

As described, the second cushioning layer 224 is disposed at least partially in series with the first cushioning layer 222 relative to the dynamic compressive load FL, GL applied on the midsole 218 as shown in FIG. 19. More specifically, the first cushioning layer 222, the second cushioning layer 224, and the third cushioning layer 226 are in series relative to the load FL, GL inward of the phantom lines 52 of FIG. 18. The third cushioning layer 226 is disposed in series only with the second cushioning layer 224 relative to the dynamic compressive load FL, GL outward of the phantom lines 52.

FIG. 18 shows the sole structure 212 in an unloaded state. When the sole structure 212 initially receives the dynamic compressive load FL, GL during the first stage of compression indicated in FIG. 19, the least stiff, first cushioning layer 222 is the first to compress by the central lug 60 driving upward toward the first sealed chamber 238, both changing the shape of the first sealed chamber 238 and compressing the gas in the first sealed chamber 238 such that the overall volume of the first sealed chamber 238 reduces relative to the that shown in FIG. 18. Compression of the second sealed chamber 240, the third cushioning layer 226, and the outsole 20 in the first stage of compression I, if any, is minimal. In the first stage of compression I, the compression of the first sealed chamber 238 causes the side lugs 62 to now form part of the ground contact surface 35 over which the ground load GL is spread, such that the ground contact surface 35 is larger in area compared to the unloaded state of FIG. 18. The midsole 218 has a stiffness during the first stage of compression I that is dependent on the first stiffness K1, and that is effectively linear as represented by the portion 102 of the stiffness curve 100.

Figure 20:
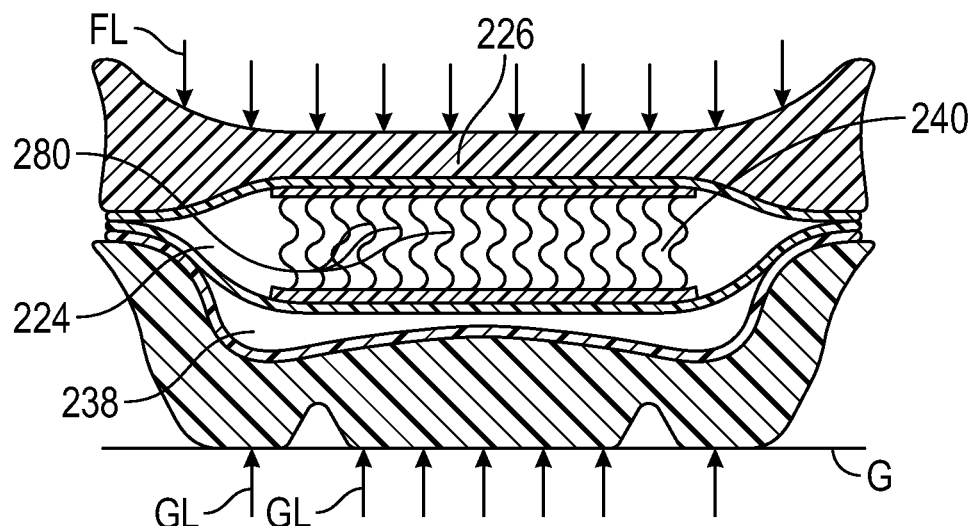
FIG. 20 is a schematic illustration in cross-sectional view of the portion of the sole structure of FIG. 18 in a second stage of compression.

In the second stage of compression II shown in FIG. 20, the third cushioning layer 226 begins compressing, as indicated by the lesser thickness of the third cushioning layer 226 in comparison to FIG. 19. Compression of the first sealed chamber 238 of the first cushioning layer 222 may continue in series with compression of the third cushioning layer 226 in the second stage of compression II assuming that the first cushioning layer 222 has not already reached its maximum compression under the dynamic compressive load. The midsole 118 has an effective stiffness during the second stage of compression II that is dependent on the third stiffness K3 and potentially the first stiffness K1, and is represented by the portion 104 of the stiffness curve 100 in FIG. 8. In the second stage of compression II, the tensile elements 280 may also begin to unload such that they are not in tension. Alternatively, the tensile elements 280 may begin unloading (i.e., going out of tension to a slack state shown in FIGS. 20 and 21) during the first stage of compression I or not until the third stage of compression III. The volume of the second sealed chamber 240 also decreases slightly when the tensile elements 280 unload. Unloading of the tensile elements 280 may cause a relatively high rate of increase in stiffness over a short amount of decompression.

Figure 21:
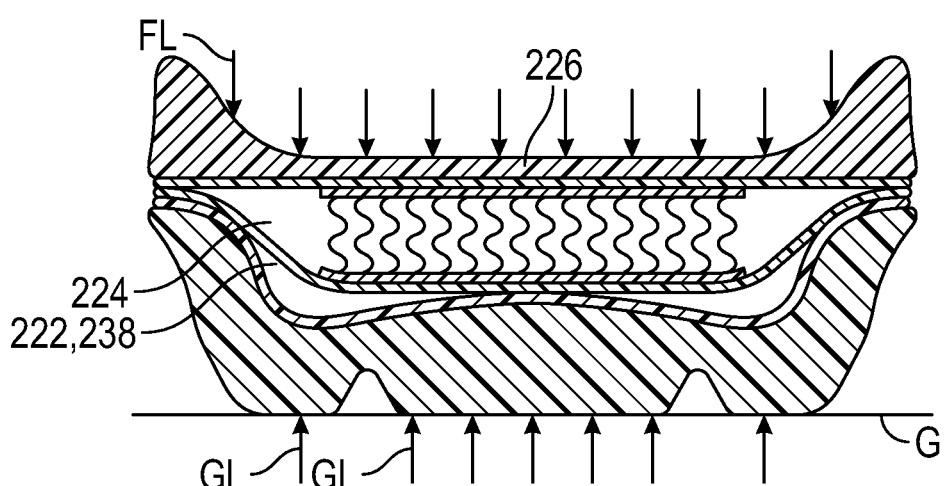
FIG. 21 is a schematic illustration in cross-sectional view of the portion of the sole structure of FIG. 18 in a third stage of compression.

In the third stage of compression III shown in FIG. 21, the second cushioning layer 224 compresses by compression of the gas in the second sealed chamber 240. If compression of the first sealed chamber 238 has not yet reached its maximum, then compression of the first sealed chamber 238 will continue in series with compression of the second cushioning layer 224. If compression of the third cushioning layer 226 has not already reached its maximum, compression of the third cushioning layer 226 will continue in series with compression of the second cushioning layer 224 and in series with compression of the first cushioning layer 222, (assuming compression of the first cushioning layer 222 has not already reached its maximum under the dynamic compressive load). Compression of the outsole 20, if any occurs under the dynamic compressive load, will not begin until after the third stage of compression III. The midsole 218 has an effective stiffness during the third stage of compression III that is dependent on the second stiffness K2 of the relatively stiff, second cushioning layer 24, and potentially to a lesser extent on the first stiffness K1 and the third stiffness K3. The effective stiffness during the third stage of compression III is represented by the portion 106 of the stiffness curve 100 in FIG. 8.

FIGS. 22-25 show another embodiment of a portion of a sole structure 312 with a midsole 318 within the scope of the present teachings. The sole structure 312 can be used as an alternative to the sole structure 12 of FIG. 1 in the article of footwear 10, and can be considered a cross-sectional view at the same location as FIG. 2 in the modified article of footwear.

The midsole 318 includes a first cushioning layer 322, a second cushioning layer 324, and a third cushioning layer 326. The first cushioning layer 322, the second cushioning layer 324, and the third cushioning layer 326 are stacked with the second cushioning layer 324 overlying the first cushioning layer 322, and the third cushioning layer 326 overlying the second cushioning layer 324 when the midsole 318 is included in the article of footwear 10 and the article of footwear 10 is worn on the foot 16 so that the sole structure 312 is disposed with the third cushioning layer 326 nearest the foot 16 and the first cushioning layer 322 nearest the ground surface G. An outsole 320 is secured to a ground-facing outer surface 328 of the first cushioning layer 322 and includes a ground contact surface 325. The first cushioning layer 322 defines the ground-facing outer surface 328 of the midsole 318. The third cushioning layer 326 is entirely displaced from the ground-facing outer surface 328 by the first cushioning layer 322 and the second cushioning layer 324. The third cushioning layer 326 defines the foot-facing outer surface 330 of the midsole 318. The first cushioning layer 322 is entirely displaced from the foot-facing outer surface 330 by the second cushioning layer 324 and the third cushioning layer 326.

In the embodiment shown, each of the cushioning layers 322, 324, 326 is foam. Each cushioning layer 322, 324, 326 may be a different type or density of foam. Alternatively, the first cushioning layer 322 and the third cushioning layer 326 may be the same type or density of foam. The first cushioning layer 322 has a first stiffness K1 that is determined by the properties of the foam of the first cushioning layer 322, including the material of the foam and its density. The second cushioning layer 324 has a second stiffness K2 that is determined by the properties of the foam of the second cushioning layer 324 including the material of the foam and its density. The third cushioning layer 326 has a third stiffness K3 that is determined by the properties of the foam of the third cushioning layer 326 including the material of the foam and its density. The sole structure 312 includes an outsole 320 which can have a fourth stiffness K4.

A dynamic compressive load on the sole structure 312 is due to an impact of the article of footwear 10 with the ground, as indicated by a footbed load FL of a person wearing the article of footwear 10 and an opposite ground load GL. The footbed load FL is shown as a series of arrows acting on the foot-facing outer surface 330, and the ground load GL is shown as a series of arrows acting on a ground contact surface 325 of the outsole 320, similar to as shown with respect to the corresponding surfaces of the article of footwear 10. The footbed load FL is represented by all of the downward arrows on the foot-facing outer surface 330. The ground load GL is represented by all of the upward arrows on the ground contact surface 325. The dynamic compressive load is absorbed by the first cushioning layer 322, the second cushioning layer 324, and the third cushioning layer 326 in a sequence according to relative magnitudes of the first stiffness K1, the second stiffness K2, and the third stiffness K3 from least stiff to most stiff. In the embodiment shown, the stiffness of the cushioning layers 322, 324, 326 increase in the following order: first stiffness K1, third stiffness K3, and second stiffness K2. The outsole 320 has a stiffness K4 greater than stiffness K1, stiffness K2, and stiffness K3, and absorbs a dynamic compressive load only after the cushioning layers 322, 324, 326.

Figure 22:
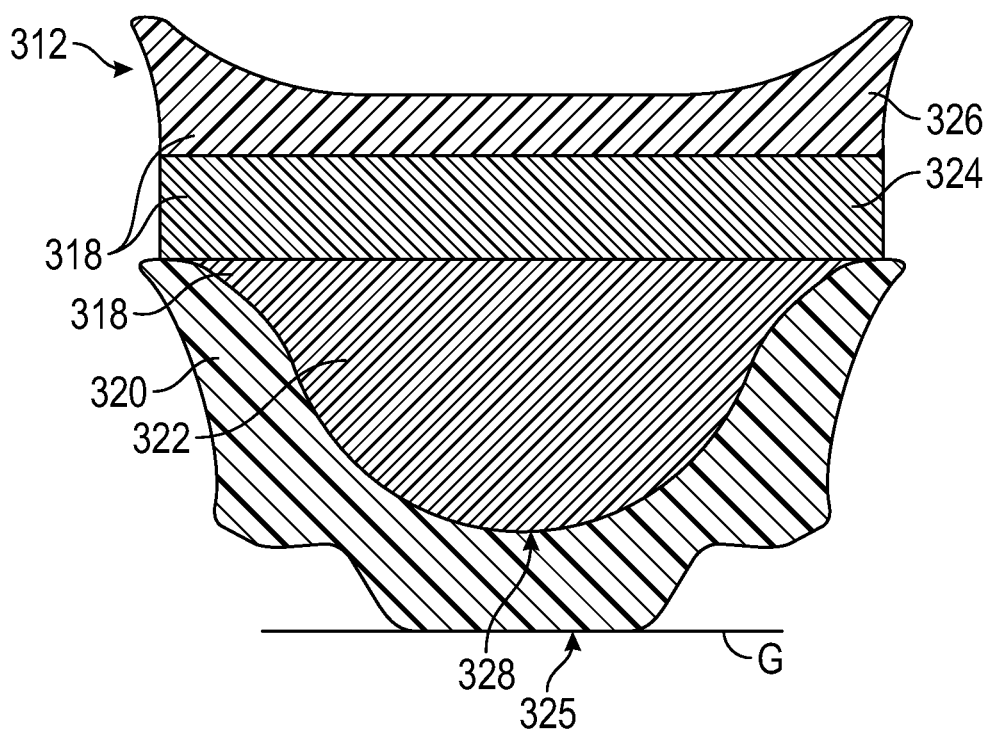
FIG. 22 is a schematic illustration in cross-sectional view of a portion of an alternative embodiment of a sole structure for an article of footwear.
Figure 23:
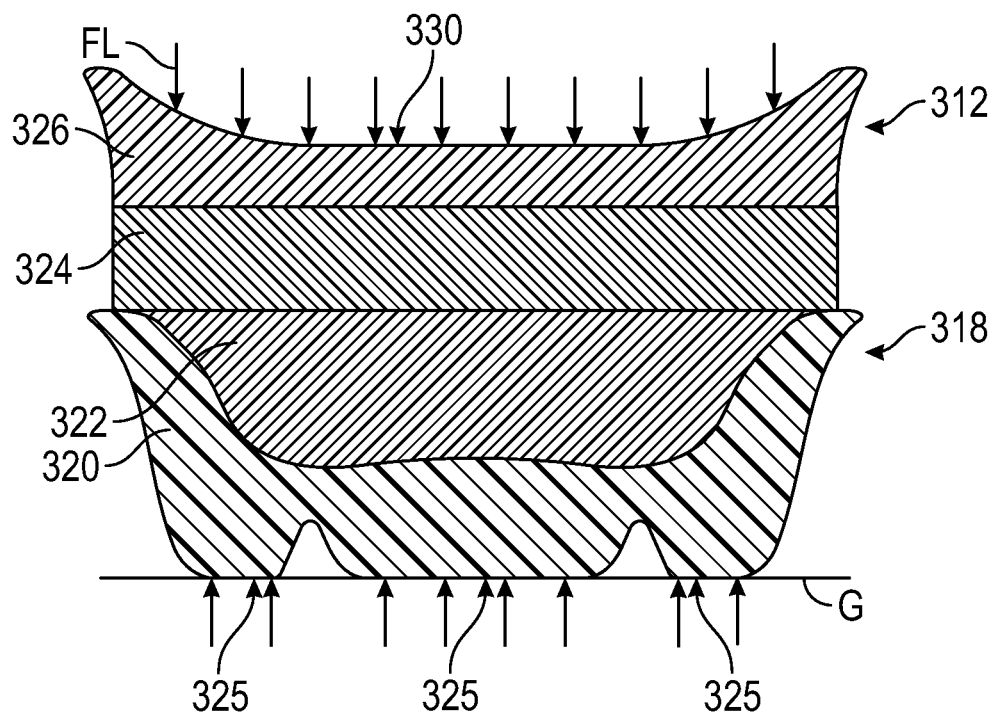
FIG. 23 is a schematic illustration in cross-sectional view of the portion of the sole structure of FIG. 22 in a first stage of compression.

When the sole structure 312 initially receives the dynamic compressive load FL, GL, as shown in FIG. 23 which represents the first stage of compression I, the least stiff first cushioning layer 322 is the first to compress, reducing in thickness as indicated in FIG. 23 relative to the unloaded state of FIG. 22. The midsole 318 has an effective stiffness during the first stage of compression I that is dependent on the first stiffness K1 of the first cushioning layer 322. The effective stiffness in the first stage of compression I can be represented as a substantially linear portion of a load versus displacement plot similar to that of FIG. 8.

Figure 24:
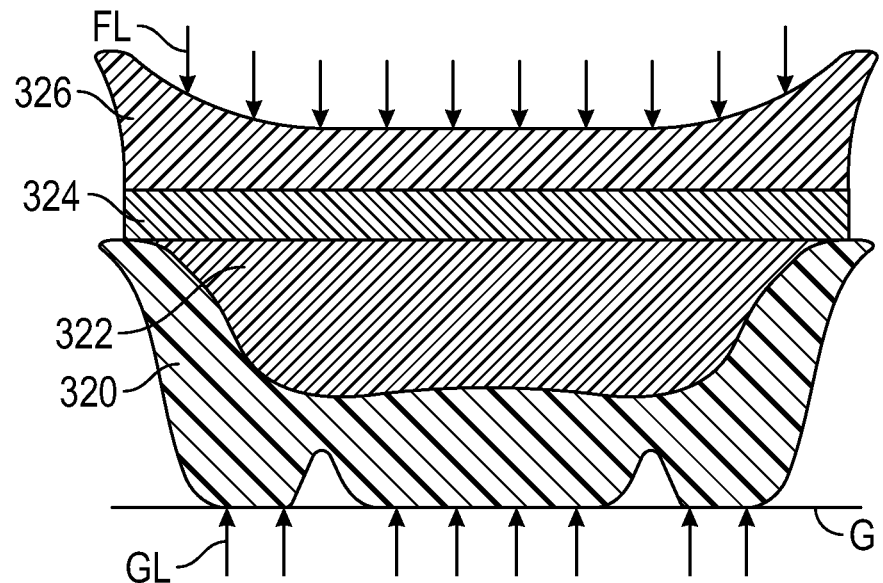
FIG. 24 is a schematic illustration in cross-sectional view of the portion of the sole structure of FIG. 22 in a second stage of compression.

In the second stage of compression II shown in FIG. 24, the third cushioning layer 326 begins compressing, as indicated by the lesser thickness of the third cushioning layer 326 in FIG. 24 relative to FIGS. 22 and 23. Compression of the first cushioning layer 322 may continue in series with compression of the third cushioning layer 326 in the second stage of compression II assuming that the first cushioning layer 322 has not reached its maximum compression under the dynamic compressive load. The midsole 318 has an effective stiffness during the second stage of compression II that is dependent on the third stiffness K3 of the third cushioning layer, and may also be dependent on the first stiffness K1 to a lesser extent. The effective stiffness in the second stage of compression II can be represented as a substantially linear portion of a load versus displacement plot but with a higher rate than in the first stage of compression I.

Figure 25:
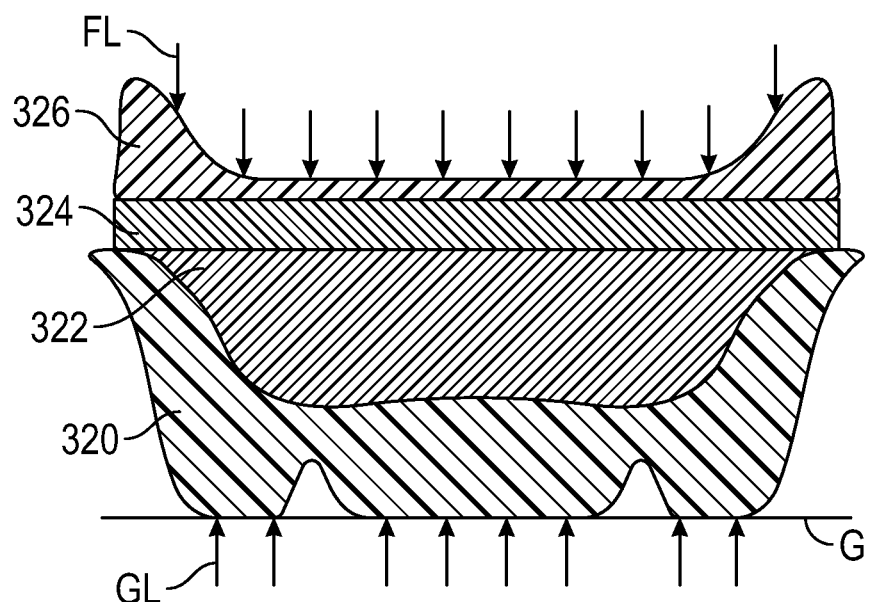
FIG. 25 is a schematic illustration in cross-sectional view of the portion of the sole structure of FIG. 22 in a third stage of compression.

In the third stage of compression III shown in FIG. 25, the second cushioning layer 324 begins compressing, as indicated by the lesser thickness of the second cushioning layer 324 in FIG. 25 in comparison to FIGS. 22-24. If compression of the first and third cushioning layers 322, 326 have not reached their maximum under the dynamic compressive load in the second stage II, compression of the third cushioning layer 326 and the first cushioning layer 322 continue in series with compression of the second cushioning layer 324. Compression of the outsole 320, if any occurs under the dynamic compressive load, will not begin until after compression of the second cushioning layer 324. The midsole 318 has an effective stiffness during the third stage of compression III that is dependent on the stiffness K2 of the relatively stiff second cushioning layer 324, and potentially to a lesser extent on the stiffness K1 and the stiffness K3. The effective stiffness in the third stage of compression III can be represented as a substantially linear portion of a load versus displacement plot but with a higher rate than in the second stage of compression II. Because the third stage of compression III occurs after the first and second stages, it may coincide with movement of the article of footwear to a dorsiflexed position in which the athlete is near a final "toe off".

Various additional embodiments of midsoles within the scope of the present teachings are shown in FIGS. 26-36. Each of the midsoles of FIGS. 26-36 has multiple polymeric sheets that are stacked on one another and form multiple sealed chambers of various stiffness. Each includes a first cushioning layer with a first stiffness K1, a second cushioning layer with a second stiffness K2, and a third cushioning layer with a third stiffness K3. The first cushioning layer, the second cushioning layer, and the third cushioning layer are disposed with the second cushioning layer at least partially overlying the first cushioning layer, and the third cushioning layer overlying the second cushioning layer when an article of footwear with a sole structure including the midsole is worn on a foot so that the sole structure is disposed with the third cushioning layer nearest the foot and the first cushioning layer nearest a ground surface. Embodiments with three polymeric sheets form and define two sealed chambers and have a third cushioning layer that may be foam, similar to the embodiment of FIG. 2. Embodiments with four polymeric sheets form and define three sealed chambers. A dynamic compressive load on any of these midsoles is absorbed by the first cushioning layer, the second cushioning layer, and the third cushioning layer in a sequence according to relative magnitudes of the first stiffness K1, the second stiffness K2, and the third stiffness K3 from least stiff to most stiff. The polymeric sheets represented in each of the embodiments of FIGS. 26-36 are represented as opaque, and thus chambers identified therein are indicated with dashed lines. Alternatively, any or all of the polymeric sheets of the midsoles of FIGS. 26-36 can be substantially transparent.

Figure 26:
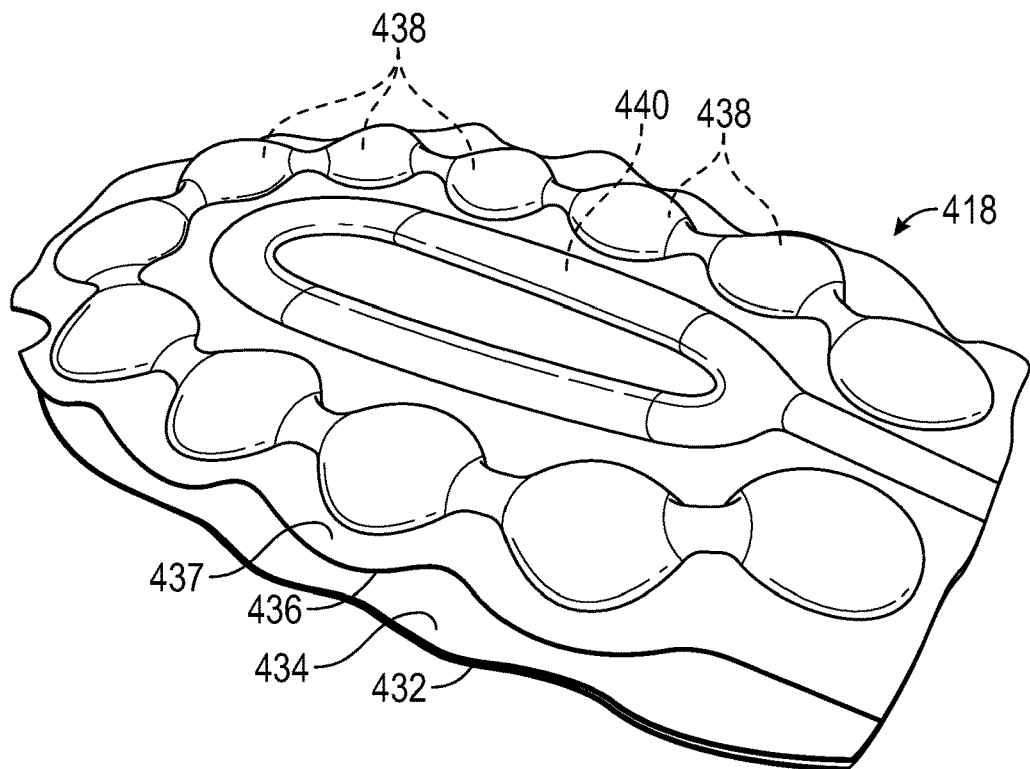
FIG. 26 is a schematic illustration in perspective view of an alternative embodiment of a midsole for an article of footwear.
Figure 27:
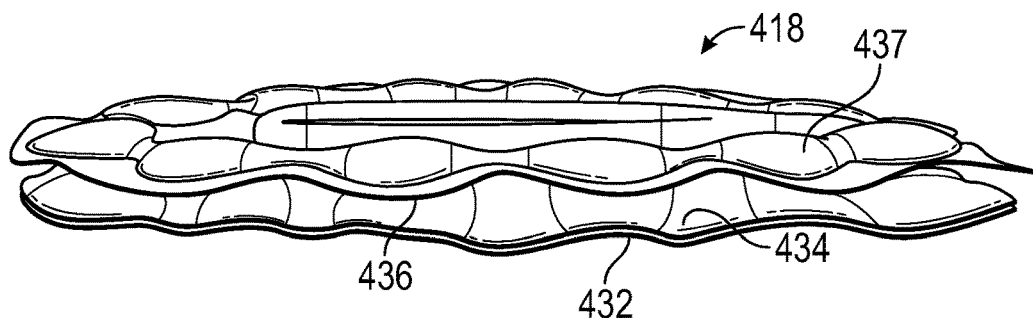
FIG. 27 is a schematic illustration in perspective side view of the midsole of FIG. 26

FIGS. 26 and 27 show a four-sheet midsole 418 having a first polymeric sheet 432, a second polymeric sheet 434, a third polymeric sheet 436 and a fourth polymeric sheet 437 defining an annular chamber 440, and at least partly spherical chambers 438, each spherical chamber 438 having a domed surface.

Figure 28:
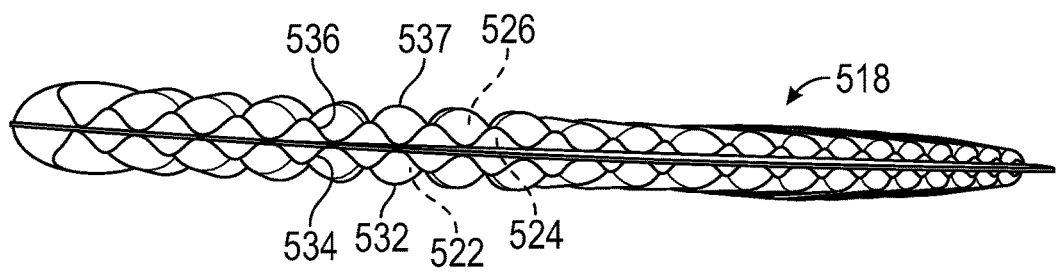
FIG. 28 is a schematic illustration in side view of an alternative embodiment of a midsole for an article of footwear.
Figure 29:
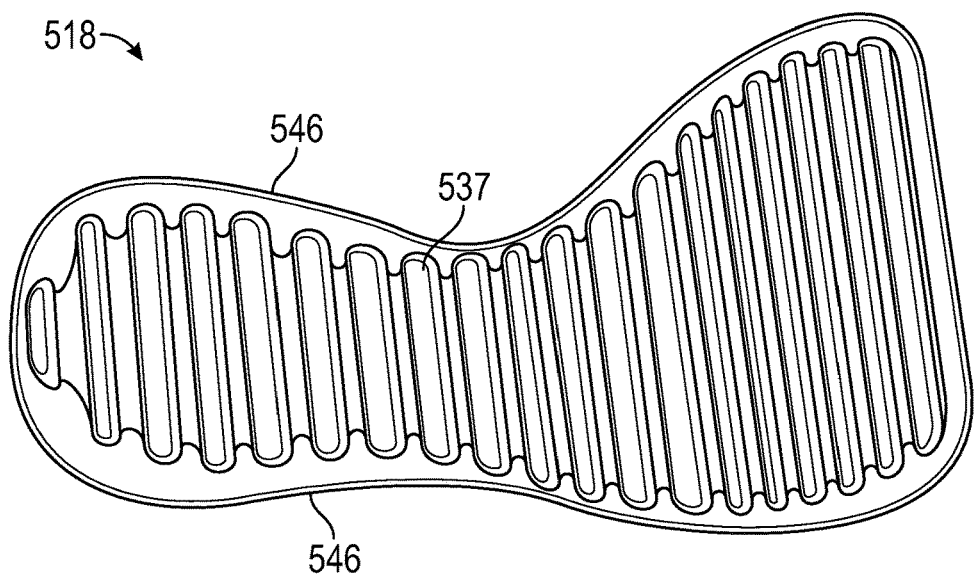
FIG. 29 is a schematic illustration in plan view of the midsole of FIG. 28.

FIGS. 28 and 29 show a four-sheet midsole 518 having a first polymeric sheet 532, a second polymeric sheet 534, a third polymeric sheet 536 and a fourth polymeric sheet 537 stacked in order and having adjacent sheets bonded to one another interior of the outer first and fourth polymeric sheets 532, 537 to define first, second, and third cushioning layers 522, 524, 526. The second polymeric sheet 534 and the third polymeric sheet 536 are bonded to one another at relatively straight, transversely-extending bonds to tether the outer first and fourth polymeric sheets 532, 537. The midsole 518 has a perimeter flange 546 at which all four polymeric sheets 532, 534, 536, 537 are bonded to one another. The second chamber of the first cushioning layer formed at the bottom surface has domed portions at the bottom surface. The overall height of the midsole 518 tapers from the heel region (shown at the left in FIGS. 28 and 29) to the forefoot region (shown at the right in FIGS. 28 and 29).

Figure 30:
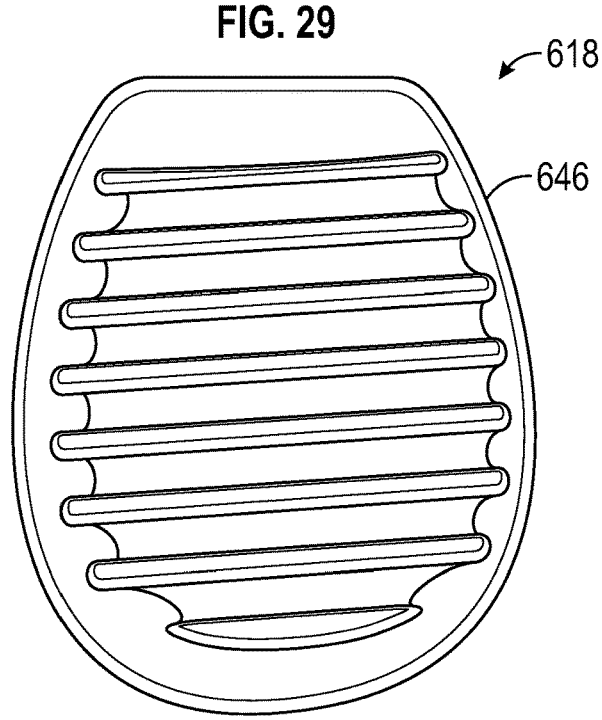
FIG. 30 is a schematic illustration in plan view of an alternative embodiment of a midsole for an article of footwear.
Figure 31:
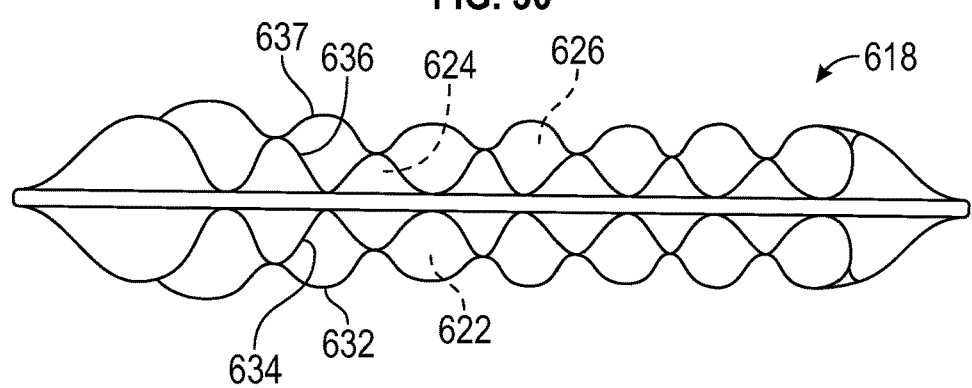
FIG. 31 is a schematic illustration in side view of the midsole of FIG. 30.

FIGS. 30 and 31 show a four-sheet midsole 618 similar to the midsole 518, but configured to extend only in a heel region of an article of footwear. The midsole 618 has a first polymeric sheet 632, a second polymeric sheet 634, a third polymeric sheet 636 and a fourth polymeric sheet 637 defining first, second, and third cushioning layers 622, 624, 626 arranged relative to one another similar to the cushioning layers of FIG. 28. The midsole 618 has a perimeter flange 646 at which all four polymeric sheets are bonded to one another.

Figure 32:
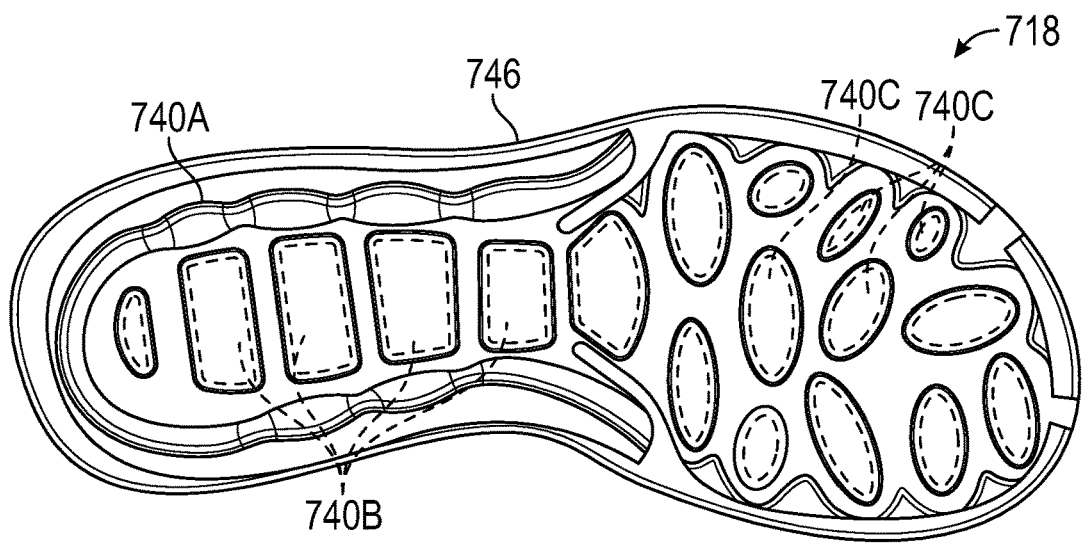
FIG. 32 is a schematic illustration in plan view of an alternative embodiment of a midsole for an article of footwear.
Figure 33:
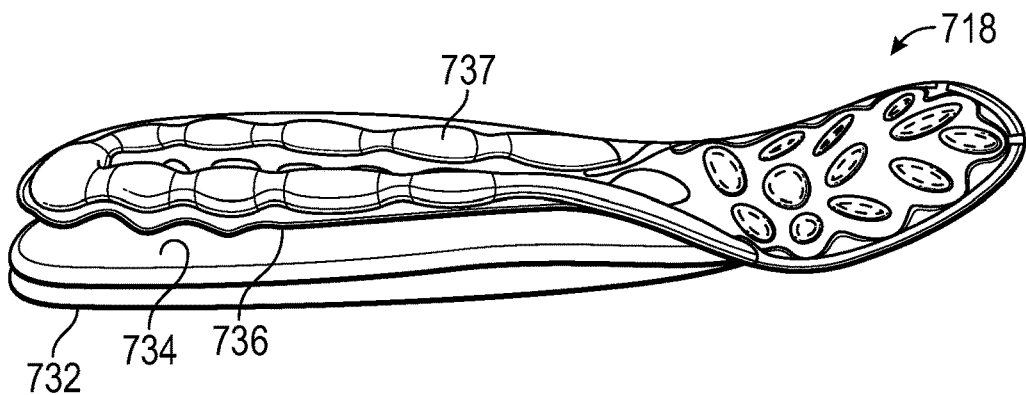
FIG. 33 is a schematic illustration in perspective side view of the midsole of FIG. 32.

FIGS. 32 and 33 show another midsole 718 having four polymeric sheets 732, 734, 736, and 737 having bonds of various shapes and corresponding first, second, and third cushioning layers of different shapes. The bonds enable a U-shaped sealed chamber 740A in a heel region toward the left of FIG. 32, rectangular sealed chambers 740B in the heel region, and oval sealed chambers 740C in the forefoot region (toward the right in FIG. 32), all with domed surfaces. The midsole 718 has a perimeter flange 746 at which all four polymeric sheets 732, 734, 736, 737 are bonded to one another.

Figure 34:
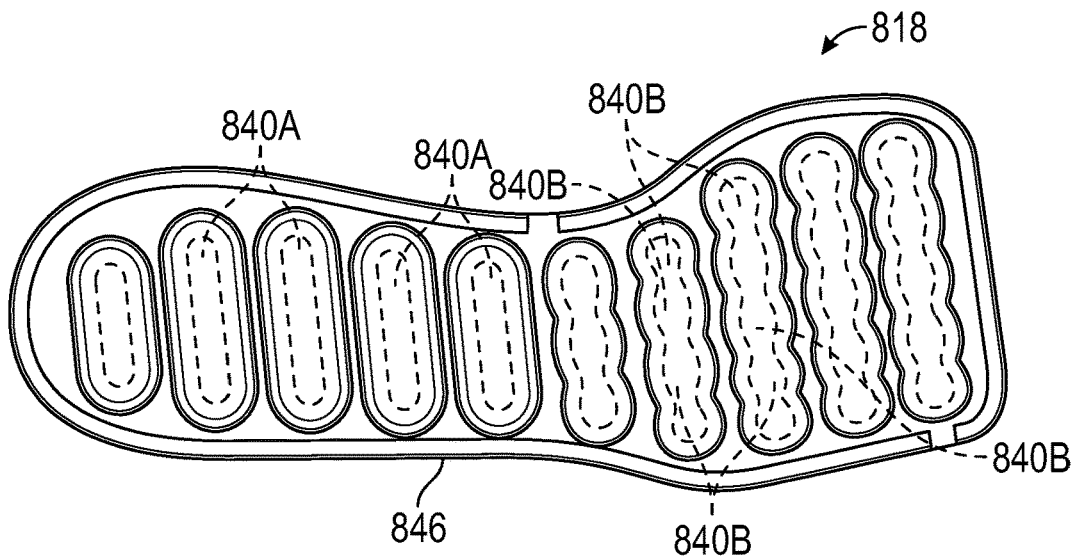
FIG. 34 is a schematic illustration in plan view of an alternative embodiment of a midsole of an article of footwear.

FIG. 34 shows another midsole 818 of multiple polymeric sheets defining cushioning chambers including elongated oval chambers 840A and smaller, at least partly spherical chambers 840B, all with domed surfaces. The midsole 818 has a perimeter flange 846 at which all of the polymeric sheets are bonded to one another.

Figure 35:
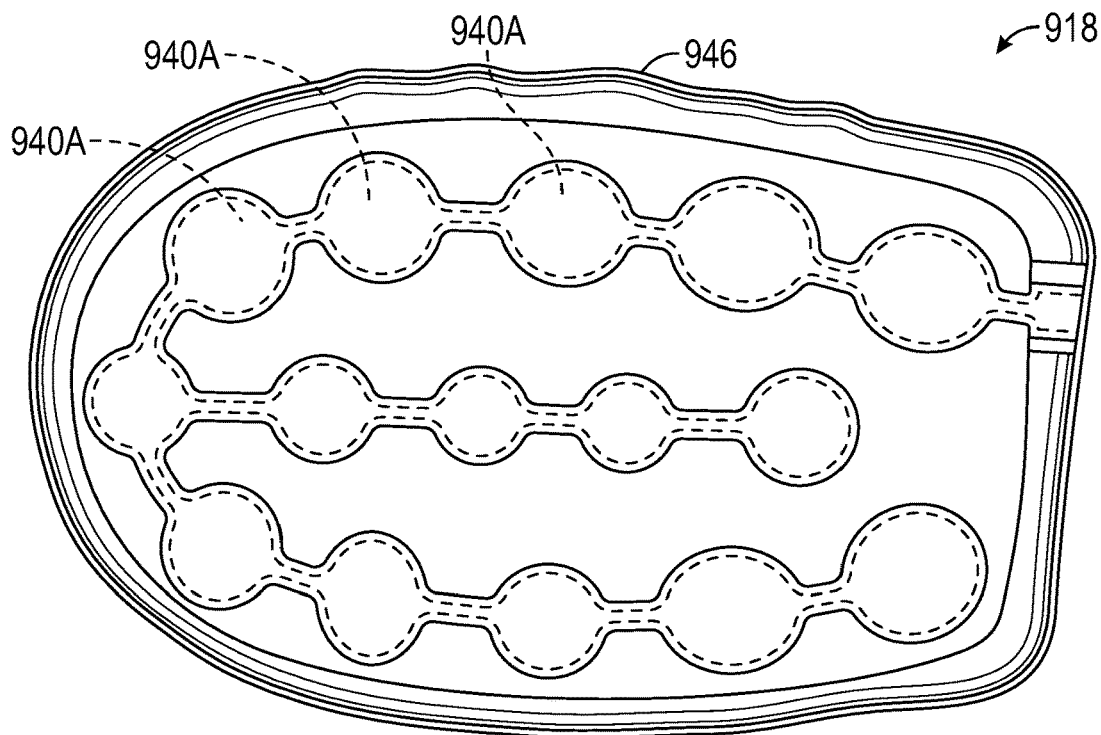
FIG. 35 is a schematic illustration in plan view of an alternative embodiment of a midsole of an article of footwear.

FIG. 35 shows another midsole 918 of multiple polymeric sheets defining cushioning chambers including fluidly-interconnected, at least partly spherical chambers 940A with domed surfaces. The midsole 918 has a perimeter flange 946 at which all of the polymeric sheets are bonded to one another.

Figure 36:
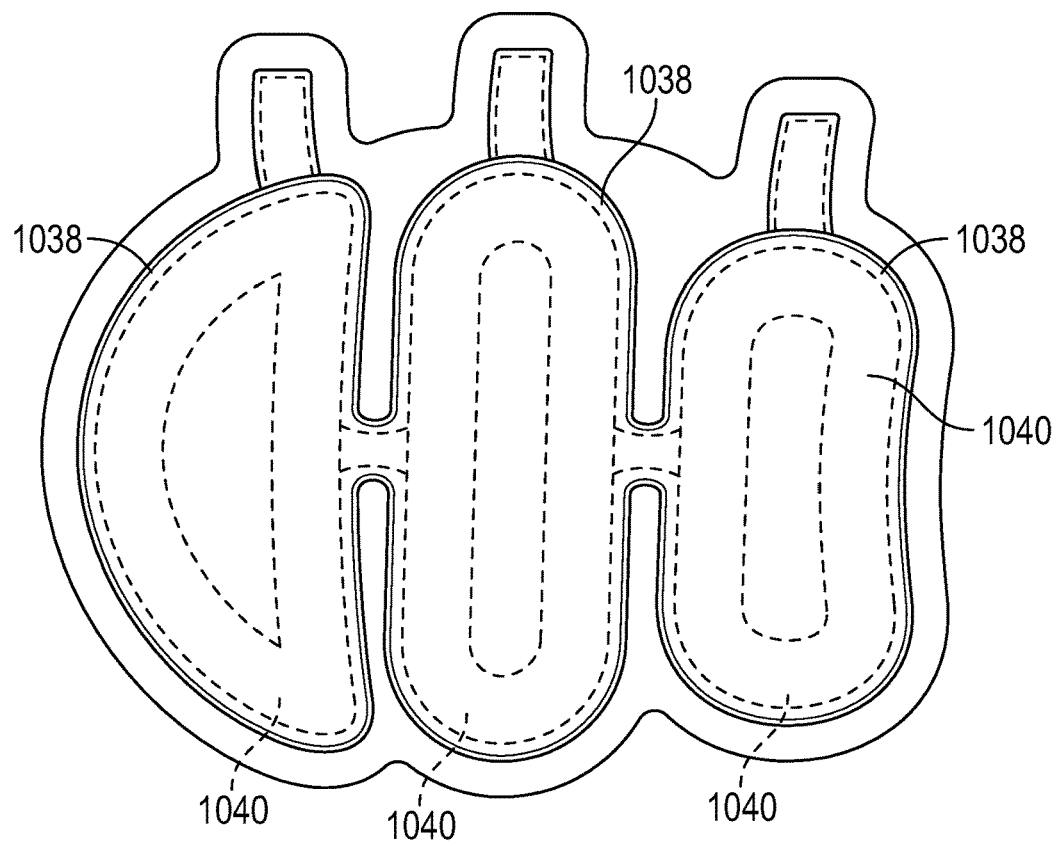
FIG. 36 is a schematic illustration in plan view of an alternative embodiment of a midsole of an article of footwear.

FIG. 36 shows another midsole 1018 of multiple polymeric sheets defining cushioning chambers including fluidly interconnected sealed chambers 1038 with domed surfaces, and at least one of which is kidney-shaped, and annular sealed chambers 1040 internal to the chambers 1038.

In one non-limiting example, the various embodiments of midsoles disclosed herein may provide peak loads in Newtons from about 110 N to about 320 N, where peak load is defined as 75 percent displacement in average height of the midsole. Compressive stiffness can be evaluated using ASTM F1614-99(2006), or ASTM F1976, Standard Test Method for Impact Attenuation of Athletic Shoe Cushioning Systems and Materials, or other test methods may be used.

In one non-limiting example, the various embodiments of midsoles disclosed herein may provide energy return from about 59% to about 82%, when energy return is measured as the percent restoration of initial drop height of an impact tester, or is measured with a mechanical tester such as an INSTRON® tester available from Instron Corporation, Norwood Mass.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear" or "footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. As used in the description and the accompanying claims, unless stated otherwise, a value is considered to be "approximately" equal to a stated value if it is neither more than 5 percent greater than nor more than 5 percent less than the stated value. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of an article of footwear extends between a forefoot region and a heel region of the article of footwear. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of an article of footwear extends between a lateral side and a medial side of the article of footwear. The transverse direction or axis may also be referred to as a lateral direction or axis or a mediolateral direction or axis.

The term "vertical" refers to a direction generally perpendicular to both the lateral and longitudinal directions. For example, in cases where a sole structure is planted flat on a ground surface, the vertical direction may extend from the ground surface upward. It will be understood that each of these directional adjectives may be applied to individual components of a sole structure. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the article of footwear is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the article of footwear in an assembled article of footwear. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A sole structure for an article of footwear, the sole structure comprising:
    a midsole including a first cushioning layer, a second cushioning layer, and a third cushioning layer; and
    a tether element disposed in the second cushioning layer;
    wherein:
        the first cushioning layer, the second cushioning layer, and the third cushioning layer are stacked with the second cushioning layer directly overlying the first cushioning layer, the third cushioning layer overlying the second cushioning layer;
        the first cushioning layer has a domed lower surface extending away from the second cushioning layer and the third cushioning layer and substantially centered under the second cushioning layer;
        the midsole includes a first polymeric sheet, a second polymeric sheet, and a third polymeric sheet;
        the first cushioning layer includes a first sealed chamber bounded by the first polymeric sheet and the second polymeric sheet;
        the second cushioning layer includes a second sealed chamber bounded by the second polymeric sheet and the third polymeric sheet; and
        the tether element is disposed in the second sealed chamber.

2. The sole structure of claim 1, wherein the tether element includes a first plate bonded to an inner surface of the third polymeric sheet, a second plate bonded to an inner surface of the second polymeric sheet, and a plurality of tensile elements connecting the first plate to the second plate and suspended across the second sealed chamber.

3. The sole structure of claim 2, wherein the tensile elements are in tension when the second sealed chamber is in an unloaded state and are in a slack state when the second sealed chamber compresses under a dynamic compressive load on the sole structure.

4. The sole structure of claim 1, wherein the first polymeric sheet and the second polymeric sheet are bonded to one another along an underside of an outer peripheral portion of the second sealed chamber such that the first sealed chamber underlies the second sealed chamber only inward of the outer peripheral portion.

5. The sole structure of claim 4, wherein:
    the second cushioning layer absorbs a dynamic compressive load in parallel with the first cushioning layer at the outer peripheral portion of the second sealed chamber; and
    the first cushioning layer absorbs the dynamic compressive load in series with the second cushioning layer and in series with the third cushioning layer inward of the outer peripheral portion of the second sealed chamber.

6. The sole structure of claim 1, wherein:
    the first sealed chamber retains a gas at a first predetermined pressure in an unloaded state; and
    the second sealed chamber retains a gas at a second predetermined pressure in the unloaded state different than the first predetermined pressure.

7. The sole structure of claim 1, wherein:
    the first cushioning layer has a first stiffness, the second cushioning layer has a second stiffness greater than the first stiffness, and the third cushioning layer has a third stiffness; and
    a dynamic compressive load on the sole structure is absorbed by the first cushioning layer, the second cushioning layer, and the third cushioning layer in a sequence according to relative magnitudes of the first stiffness, the second stiffness, and the third stiffness.

8. The sole structure of claim 1, wherein the third cushioning layer is foam.

9. The sole structure of claim 1, wherein:
    the first cushioning layer defines a ground-facing outer surface of the midsole;
    the third cushioning layer is entirely displaced from the ground-facing outer surface of the midsole by the first cushioning layer and the second cushioning layer;
    the third cushioning layer defines a foot-facing outer surface of the midsole; and
    the first cushioning layer is entirely displaced from the foot-facing outer surface of the midsole by the second cushioning layer and the third cushioning layer.

10. A sole structure for an article of footwear, the sole structure comprising:
    a midsole including a first cushioning layer, a second cushioning layer, and a third cushioning layer;
    a tether element disposed in the second cushioning layer;
    wherein the first cushioning layer, the second cushioning layer, and the third cushioning layer are stacked with the second cushioning layer directly overlying the first cushioning layer, the third cushioning layer overlying the second cushioning layer;

wherein the first cushioning layer has a domed lower surface extending away from the second cushioning layer and the third cushioning layer and substantially centered under the second cushioning layer;

an outsole secured to the domed lower surface of the first cushioning layer;

wherein the outsole includes a central lug substantially centered under the domed lower surface of the first cushioning layer and providing a ground contact surface of the midsole; and wherein a width of the central lug is less than a width of the domed lower surface of the first cushioning layer such that the central lug compresses a center of the domed lower surface of the first cushioning layer under a compressive load.

11. The sole structure of claim 10, wherein:

the outsole further comprises side lugs disposed adjacent to the central lug;

the central lug is lower than the side lugs under a first compressive load; and under a second compressive load greater than the first compressive load, the first cushioning layer compresses, moving the side lugs level with the central lug, thereby increasing ground contact area of the outsole.

12. A sole structure for an article of footwear, the sole structure comprising:

a midsole having:
 a first cushioning layer with a domed lower surface;
 a second cushioning layer overlying the first cushioning layer and disposed at least partially in series with the first cushioning layer relative to a dynamic compressive load applied on the midsole; wherein the second cushioning layer defines a sealed chamber that retains gas at a predetermined pressure in an unloaded state;
 a tether element disposed in the sealed chamber; and
 a third cushioning layer overlying the first cushioning layer and the second cushioning layer and disposed at least partially in series with the first cushioning layer and at least partially in series with the second cushioning layer relative to the dynamic compressive load;

wherein the first cushioning layer has a first stiffness, the second cushioning layer has a second stiffness greater than the first stiffness, and the third cushioning layer has a third stiffness less than the second stiffness;

wherein the midsole includes a first polymeric sheet, a second polymeric sheet, and a third polymeric sheet;

wherein the first cushioning layer includes a first sealed chamber bounded by the first polymeric sheet and the second polymeric sheet and retaining a gas at a first predetermined pressure in an unloaded state;

wherein the sealed chamber of the second cushioning layer is a second sealed chamber bounded by the second polymeric sheet and the third polymeric sheet and the predetermined pressure in the second sealed chamber in the unloaded state is a second predetermined pressure; and wherein the second predetermined pressure is higher than the first predetermined pressure.

13. The sole structure of claim 12, wherein the tether element includes a first plate bonded to an inner surface of the third polymeric sheet, a second plate bonded to an inner surface of the second polymeric sheet, and a plurality of tensile elements connecting the first plate to the second plate and suspended across the second sealed chamber.

14. The sole structure of claim 13, wherein the tensile elements are in tension when the second sealed chamber is in an unloaded state and are in a slack state when the second sealed chamber compresses under a dynamic compressive load on the sole structure.

15. The sole structure of claim 13, wherein the first polymeric sheet and the second polymeric sheet are bonded to one another along an underside of an outer peripheral portion of the second sealed chamber such that the first sealed chamber underlies the second sealed chamber only inward of the outer peripheral portion.

16. The sole structure of claim 15, wherein:

the second cushioning layer absorbs a dynamic compressive load in parallel with the first cushioning layer at the outer peripheral portion of the second sealed chamber, and the first cushioning layer absorbs the dynamic compressive load in series with the second cushioning layer and in series with the third cushioning layer inward of the outer peripheral portion of the second sealed chamber.

* * * * *